(12) United States Patent
Tseng et al.

(10) Patent No.: US 10,699,092 B2
(45) Date of Patent: Jun. 30, 2020

(54) OPTICAL SENSOR AND MANUFACTURING METHOD THEREOF

(71) Applicant: Vanguard International Semiconductor Corporation, Hsinchu (TW)

(72) Inventors: Han-Liang Tseng, Hsinchu (TW); Hsin-Hui Lee, Kaohsiung (TW)

(73) Assignee: VANGUARD INTERNATIONAL SEMICONDUCTOR CORPORATION, Hsinchu (TW)

( * ) Notice: Subject to any disclaimer, the term of this patent is extended or adjusted under 35 U.S.C. 154(b) by 154 days.

(21) Appl. No.: 15/973,812

(22) Filed: May 8, 2018

(65) Prior Publication Data

US 2019/0347462 A1 Nov. 14, 2019

(51) Int. Cl.
| | |
|---|---|
| *G06K 9/20* | (2006.01) |
| *G06K 9/00* | (2006.01) |
| *G02B 5/20* | (2006.01) |
| *G02B 5/00* | (2006.01) |
| *G02B 27/30* | (2006.01) |

(52) U.S. Cl.
CPC .......... *G06K 9/00013* (2013.01); *G02B 5/003* (2013.01); *G02B 5/208* (2013.01); *G02B 27/30* (2013.01)

(58) Field of Classification Search
CPC .................. G06K 9/0004–9/00046; G06K 9/00006–9/0012; G02B 27/30
See application file for complete search history.

(56) References Cited

U.S. PATENT DOCUMENTS

| | | | |
|---|---|---|---|
| 2017/0133818 A1* | 5/2017 | Cok | ............ G02B 5/0242 |
| 2017/0286743 A1* | 10/2017 | Lee | ............ G02B 5/201 |
| 2019/0050621 A1* | 2/2019 | Xu | ............ G06F 21/32 |

* cited by examiner

*Primary Examiner* — Brian Werner
(74) *Attorney, Agent, or Firm* — Birch, Stewart, Kolasch & Birch, LLP

(57) ABSTRACT

An optical sensor is provided, wherein the optical sensor includes an image sensing array, a collimator layer, and a light-shielding layer. The image sensor array includes a plurality of pixels. The collimator layer is disposed on the image sensor array and includes a plurality of openings corresponding to the pixels. The collimator layer includes a first surface facing the image sensor array and a second surface opposite to the first surface. The light-shielding layer is disposed on sidewalls of the openings.

20 Claims, 24 Drawing Sheets

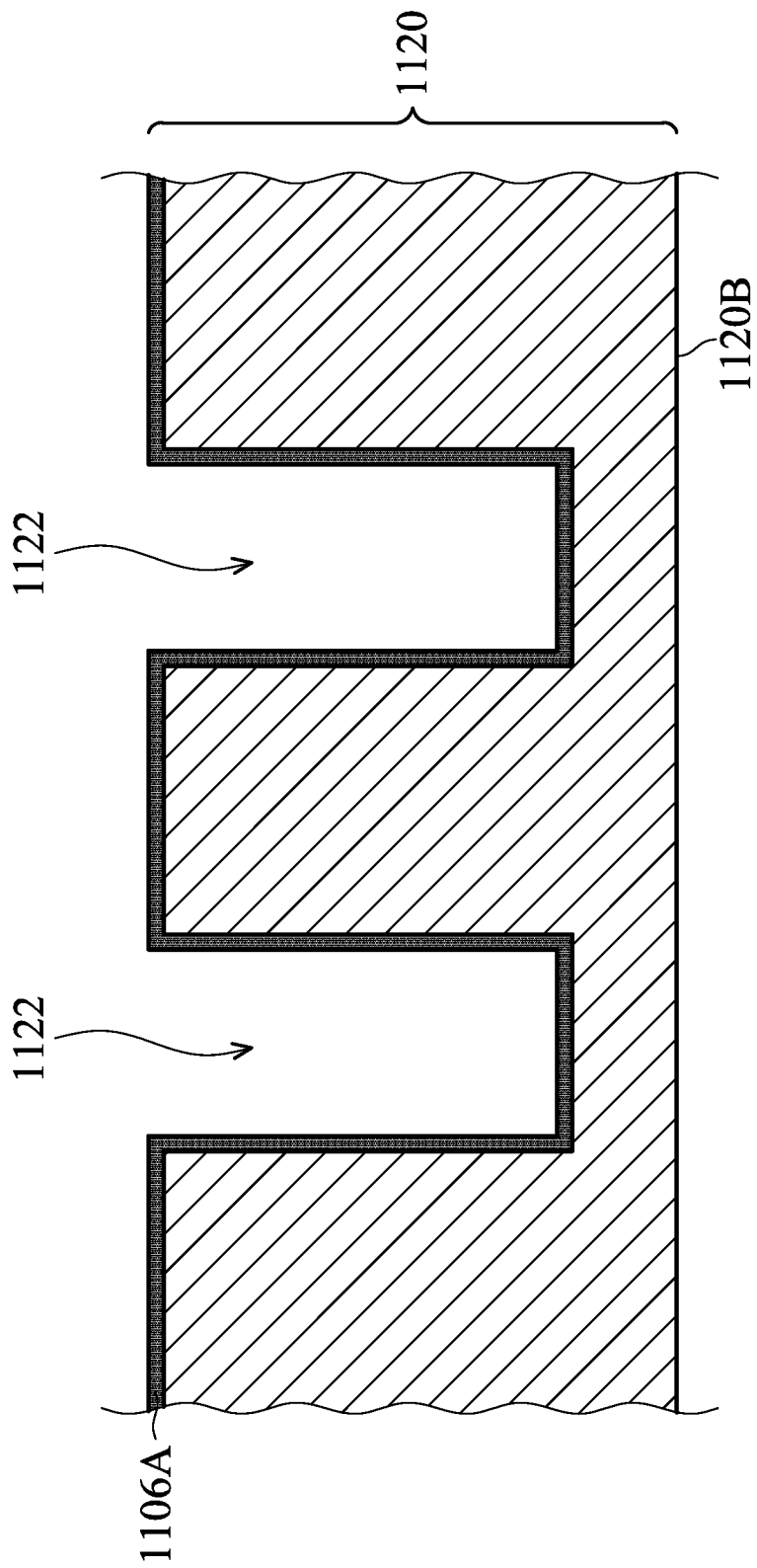

OPTICAL SENSOR AND MANUFACTURING METHOD THEREOF

BACKGROUND OF THE INVENTION

Field of the Invention

The invention relates to an optical sensor and the manufacturing method thereof, and more particularly to an optical sensor having a collimator layer and the manufacturing method thereof.

Description of the Related Art

Current mobile electronic devices such as cellphones, tablets, and notebooks are usually equipped with user identification systems for protecting personal information. Fingerprint sensing is a common and reliable user identification system because everyone has different fingerprints.

Conventional fingerprint sensors usually rely on optical technologies to detect the fingerprint of a user, and these fingerprint sensors normally utilize a collimator to ensure that the light which is incident to the sensor is parallel. However, although conventional collimators can meet most of requirements, they are not satisfactory in all aspects.

BRIEF SUMMARY OF THE INVENTION

In one embodiment of the present invention, an optical sensor is provided, wherein the optical sensor includes an image sensing array, a collimator layer, and a light-shielding layer. The image sensor array includes a plurality of pixels. The collimator layer is disposed on the image sensor array and includes a plurality of openings corresponding to the pixels, a first surface facing the image sensor array, and a second surface opposite to the first surface. The light-shielding layer is disposed on sidewalls of the openings.

In one embodiment of the present invention, a method for manufacturing an optical sensor is provided. The method includes providing an image sensing array and forming a collimator layer on the image sensing array. The image sensing array includes a plurality of pixels. The collimator layer includes openings that correspond to the pixels. The method also includes forming a light-shielding layer on sidewalls of the openings.

In one embodiment of the present invention, another method for manufacturing an optical sensor is provided, including providing a substrate, forming recesses on a front surface of the substrate, forming a first light-shielding layer on sidewalls and a bottom of the recesses, inverting and bonding the substrate to the image sensing array to allow the recesses being disposed to correspond with pixels of the image sensing array, and thinning the substrate from a back surface of the substrate until the first light-shielding layer at the bottom of the recess is removed.

BRIEF DESCRIPTION OF THE DRAWINGS

Aspects of this disclosure are best understood from the following detailed description when read with the accompanying figures. It should be noted that, in accordance with common practice in the industry, various features are not drawn to scale. In fact, the dimensions of the various features may be arbitrarily increased or reduced for clarity of discussion.

FIGS. 11A-11H are a series of cross-sectional views illustrating a method of manufacturing an optical sensor according to another embodiment of the present invention.

DETAILED DESCRIPTION OF THE INVENTION

Figure 1:
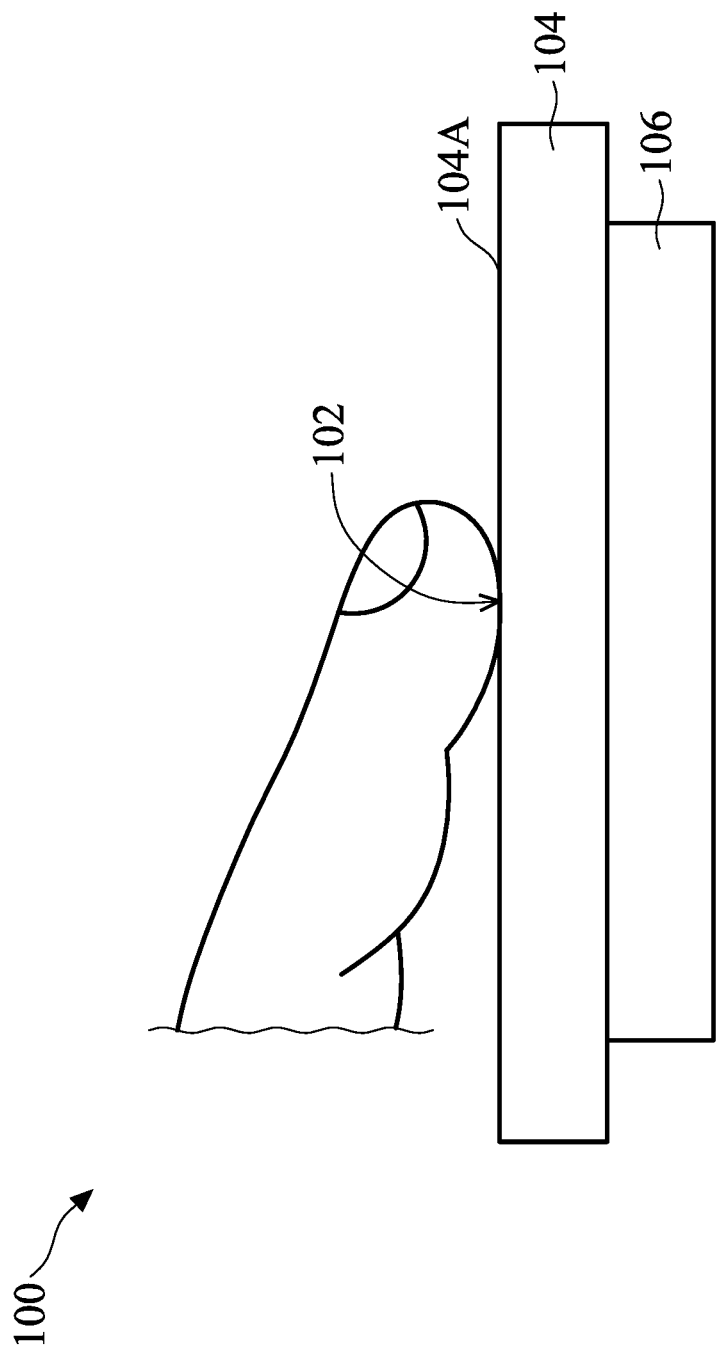
FIG. 1 is an example showing an optical sensing device detecting image from an object according to an embodiment of the present invention.

The following disclosure provides many different embodiments, or examples, for implementing different features of the subject matter provided. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "over", "below," "lower," and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented and the spatially relative descriptors used herein may likewise be interpreted accordingly.

According to some embodiments, an example of an optical sensing device 100 detecting an image from an object 102 (e.g. fingerprint) is shown in FIG. 1. The optical sensing device 100 includes a cover layer 104 and an optical sensor 106 under the cover layer 104. Other elements of the optical sensing device 100 are protected by the cover layer 104, such as the optical sensor 106 under the cover layer 104. The material used in the cover layer 104 may be transparent materials, such as glass or transparent polymers, to allow light to pass through. When the object 102 contacts an upper surface 104A of the cover layer 104, light emitted from a light source (not shown) may be reflected by the object 102 to the optical sensor 106 for detection. The object 102 includes many profile features, such as convex and concave portions (not shown). As a result, when the object 102 contacts the upper surface 104A of the cover layer 104, the convex portion of the object 102 may contact the upper surface 104A of the cover layer 104, but the concave portion of the object 102 may not contact the upper surface 104A of the cover layer 104. In other words, an air gap is formed between the concave portion of the object 102 and the upper surface 104A of the cover layer 104. As a result, light intensities received by the pixels under the convex portion and under the concave portion may be different, thereby the profile feature of the object 102 may be identified.

Figure 2:
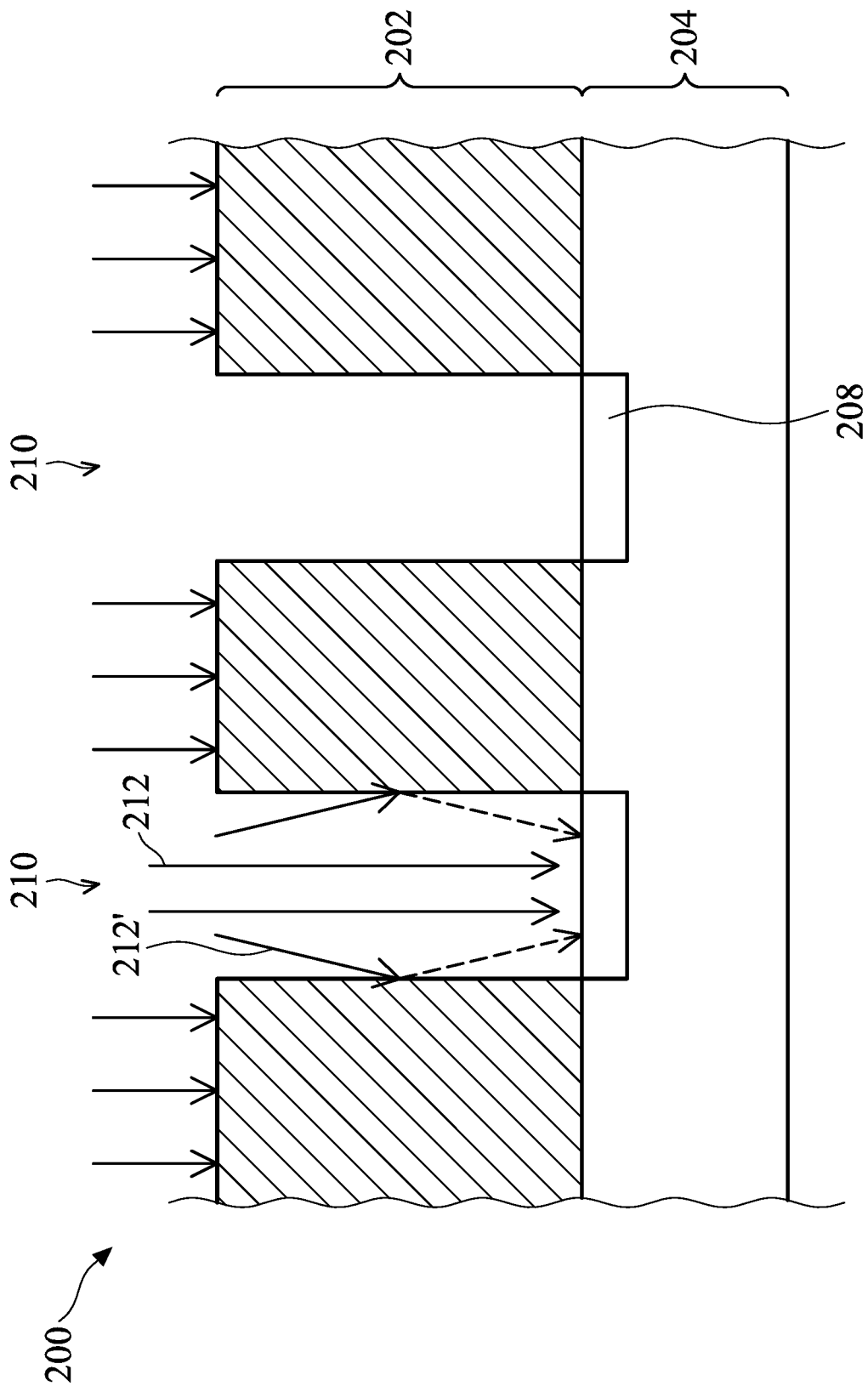
FIG. 2 is a schematic view illustrating an optical sensor.

Referring to FIG. 2, in some embodiments, an optical sensor 200 includes a collimator layer 202 and an image sensing array 204 under the collimator layer 202, wherein the collimator layer 202 is a layer-typed collimator. The image sensing array 204 further includes a plurality of pixels 208 disposed to correspond with openings 210 in the collimator layer 202 to allow incident light 212 to pass through the openings 210 of the collimator layer 202 and reach the pixels 208.

The collimator layer 202 is formed from sequentially arranged structures which can absorb the incident light, and the openings 210 are formed between these structures to allow only incident light 212 that is perpendicular to the image sensing array 204 to pass through. On the other hand, incident light which is not perpendicular to the image sensing array 204 may substantially be reflected and blocked, thereby the amount of scattering light reaching the pixels 208 may be reduced to narrow or focus the incident light. As a result, this may mitigate the problem wherein the image that the pixels 208 detect is blurry.

However, as shown in FIG. 2, some incident light 212' which is not perpendicular to the image sensing array 204 may be reflected by sidewalls of the openings 210 to reach the pixels 208 (as shown by the dashed arrow). The incident light 212' which is reflected by the sidewalls of the openings 210 and is not perpendicular to the image sensing array 204 may cause errors in image sensing. Furthermore, foreign objects created during the manufacturing process may easily enter the openings 210 to block the pixels 208, thereby blocking the pixels 208 from effectively detecting incident light. As a result, it is necessary to enhance this kind of collimator layer.

Figure 3:
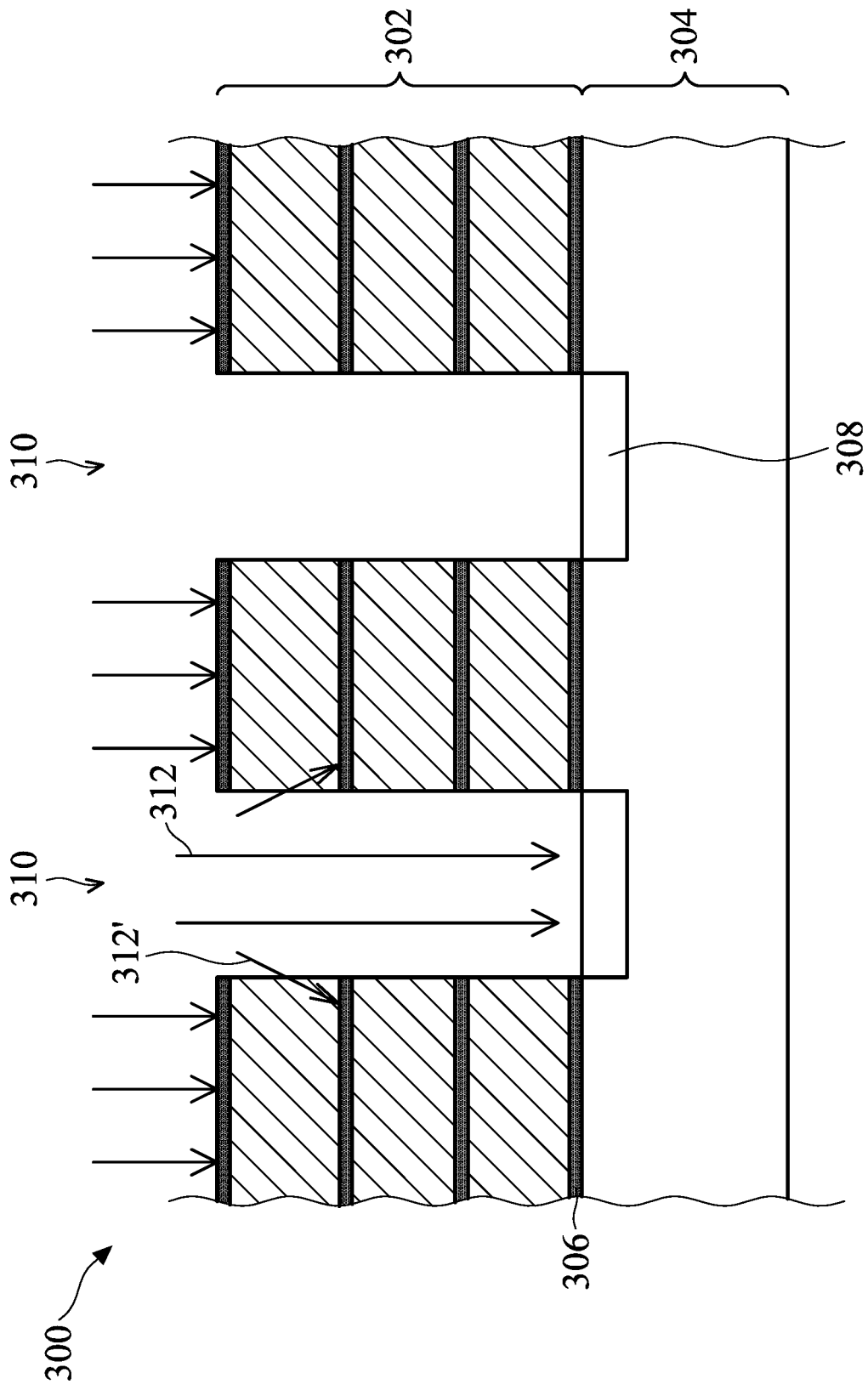
FIG. 3 is a schematic view illustrating an optical sensor.

Referring to FIG. 3, in some embodiments, an optical sensor 300 includes a collimator layer 302 and an image sensing array 304 under the collimator layer 302. The image sensing array 304 further includes a plurality of pixels 308 disposed to correspond with openings 310 in the collimator layer 302. Furthermore, the collimator layer 302 further includes a plurality of light-shielding layers 306 parallel to the surface of the image sensing array 304.

As shown in FIG. 3, the light-shielding layer 306 may further block incident light 312' that is not perpendicular to the pixels 308 to ensure that only incident light 312 that is perpendicular to the pixels 308 reaches the pixels 308. For example, the light-shielding layer 306 may absorb incident light 312' which reaches into the openings 310 and is not perpendicular to the pixels 308, thereby the incident light 312' may not be reflected by the sidewalls of the openings 310 to reach the pixels 308. However, complex processes are required for forming multiple layers of the light-shielding layer 306. For example, a plurality of deposition processes may be required to form a collimator layer 302 with a multilayer structure, so the manufacturing cost is increased. Furthermore, the thermal expansion coefficients of the materials of the collimator layer 302 and the light shield layer 306 are different, so the extent of thermal expansion of the collimator layer 302 and that of the light-shielding layer 306 may be different when the temperature changes. As a result, the image sensor 300 may warp when the temperature changes, thereby decreasing the yield. Therefore, it is necessary to make further improvements upon this kind of image sensor.

Figure 4:
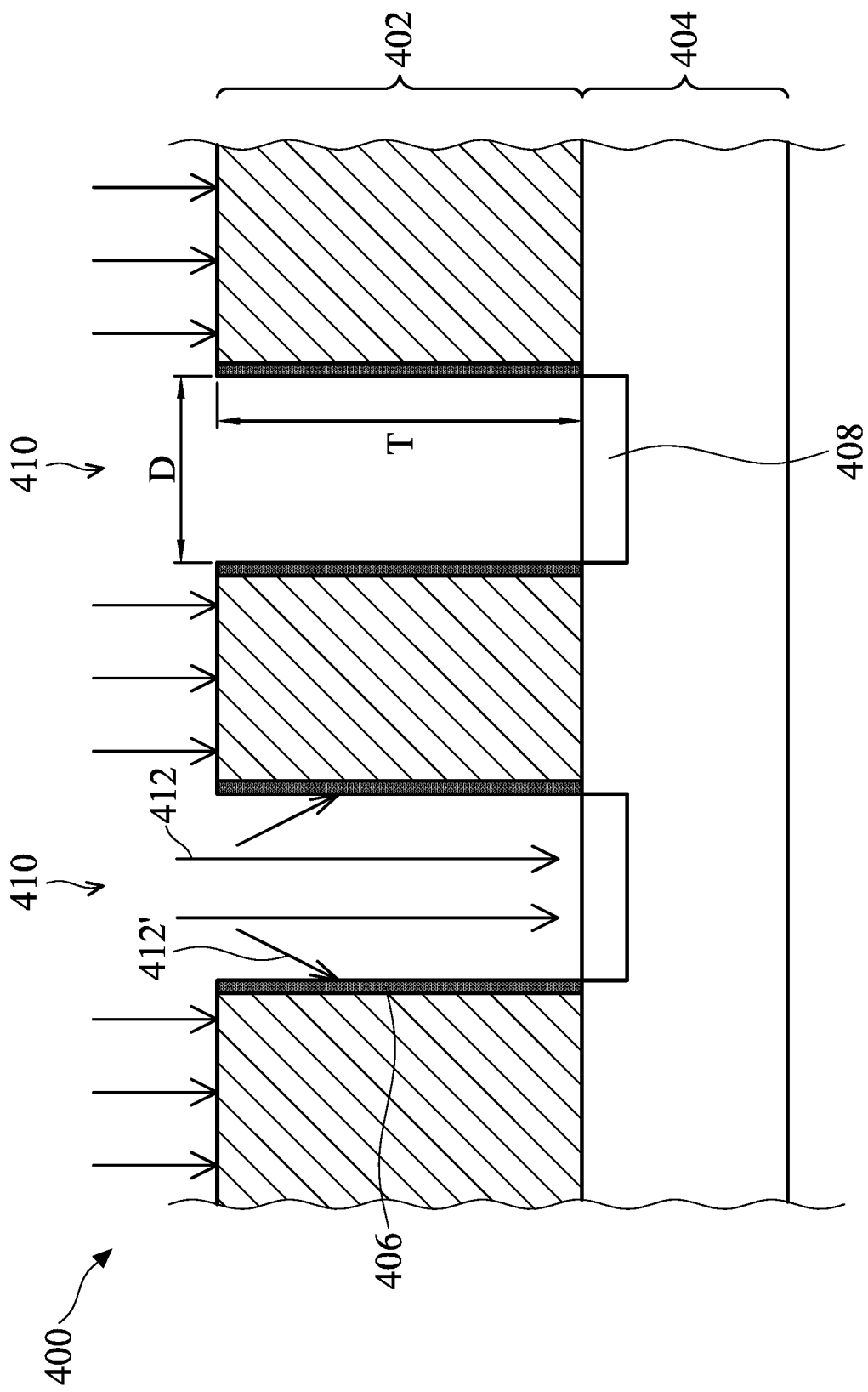
FIG. 4 is a schematic view illustrating an optical sensor according to an embodiment of the present invention.

FIG. 4 is a schematic view of an optical sensor 400 according to an embodiment of the present invention. The optical sensor 400 includes a collimator layer 402 and an image sensing array 404 under the collimator layer 402. The image sensing array 404 further includes a plurality of pixels 408 disposed to correspond with openings 410 in the collimator layer 402. In some embodiments, the thickness T of the collimator layer 402 is in a range of 1-500 µm, and the diameter D of the openings 410 is in a range of 1-100 µm. As shown in FIG. 4, a light-shielding layer 406 is disposed on sidewalls of the openings 410 to reduce image-sensing errors.

In some embodiments, the light-shielding layer 406 includes, for example, polycarbonate, polyethylene terephthalate, polyimide, carbon black, inorganic insulating or metallic material, silicon, or the like, or a combination thereof. The light absorbance of the light-shielding layer 406 between 200-1100 nm wavelengths is higher than 99%. As a result, when both of the light 412 and light 412' incident into the openings 410, the light 412' that is not perpendicular to the pixels 408 may be absorbed by the light-shielding layer 406, and only light 412 that is perpendicular to the pixels 408 may reach the pixels 408. When compared with the image sensor 200 of FIG. 2, the image sensor 400 includes a light-shielding layer 406 on the sidewalls of the openings 410 to absorb incident light 412' that is not perpendicular to the pixels 408, so the problem of distortion during image sensing may be prevented. When compared with the light-shielding layer 306 in FIG. 3, the light-shielding layer 406 can be disposed in the openings 410 easily, so the manufacturing cost may be reduced. Furthermore, the light-shielding layer 406 is only disposed on the surface of the collimator layer 402 instead of being disposed on its inside, so the problem of bending due to the difference between their thermal expansion coefficients may also be reduced.

Figure 5:
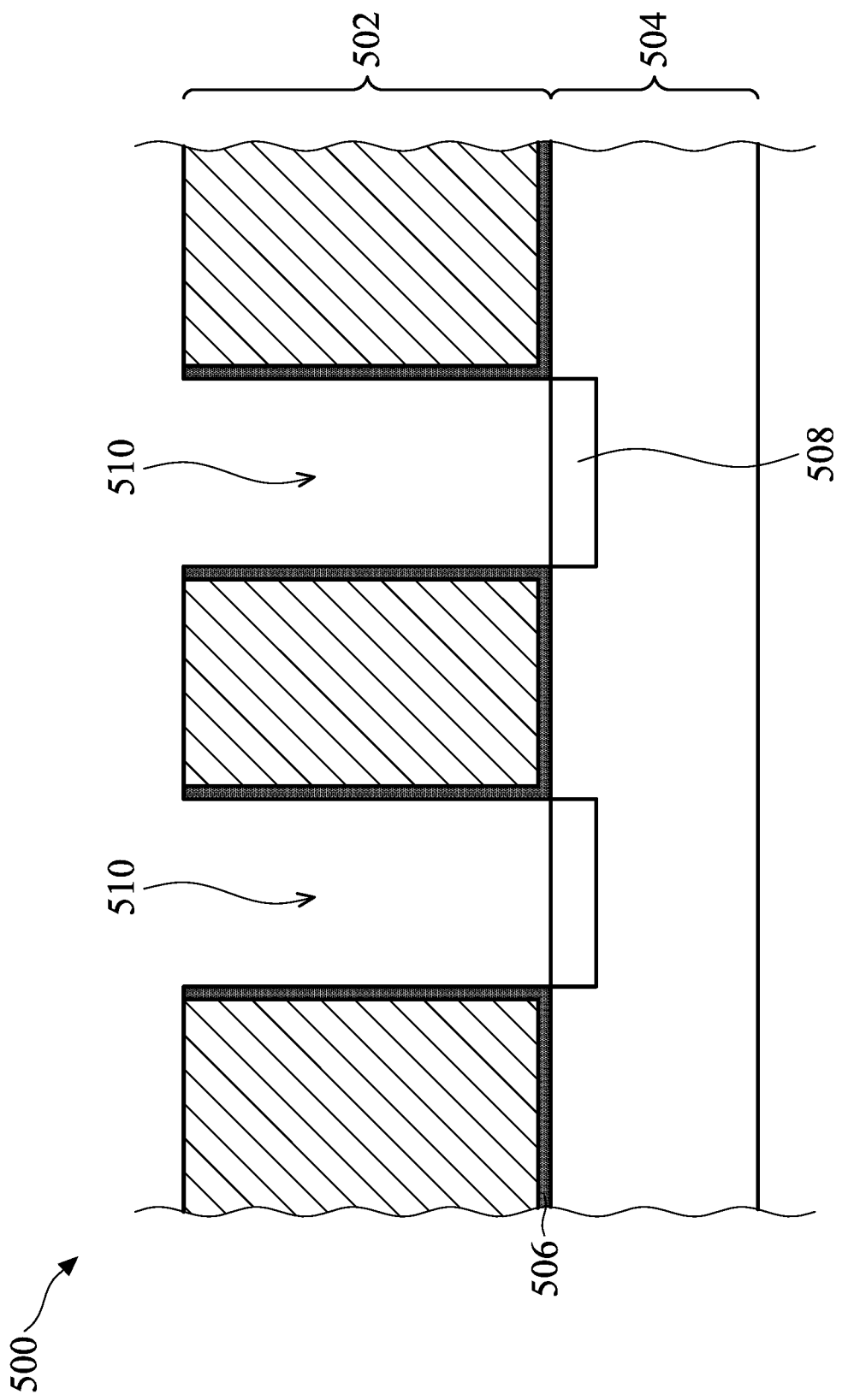
FIG. 5 is a schematic view illustrating an optical sensor according to another embodiment of the present invention.

FIG. 5 is a schematic view of an optical sensor 500 according to another embodiment of the present invention. The optical sensor 500 includes a collimator layer 502 and an image sensing array 504 under the collimator layer 502. The image sensing array 504 further includes a plurality of pixels 508 disposed to correspond with openings 510 in the collimator layer 502. Furthermore, a light-shielding layer 506 is disposed between a back surface of the image sensing array 504 and the collimator layer 502, and is disposed on sidewalls of the openings 510.

The difference between the image sensor 500 and the image sensor 400 in FIG. 4 is that a light-shielding layer 506 is further disposed between the image sensing array 504 and the collimator layer 502. Using this configuration, unwanted incident light may be absorbed further due to the additional light-shielding layer 506, and only incident light that is perpendicular to the pixels 508 is allowed to reach the pixels 508, so the problem of image distortion during image sensing may be prevented.

Figure 6:
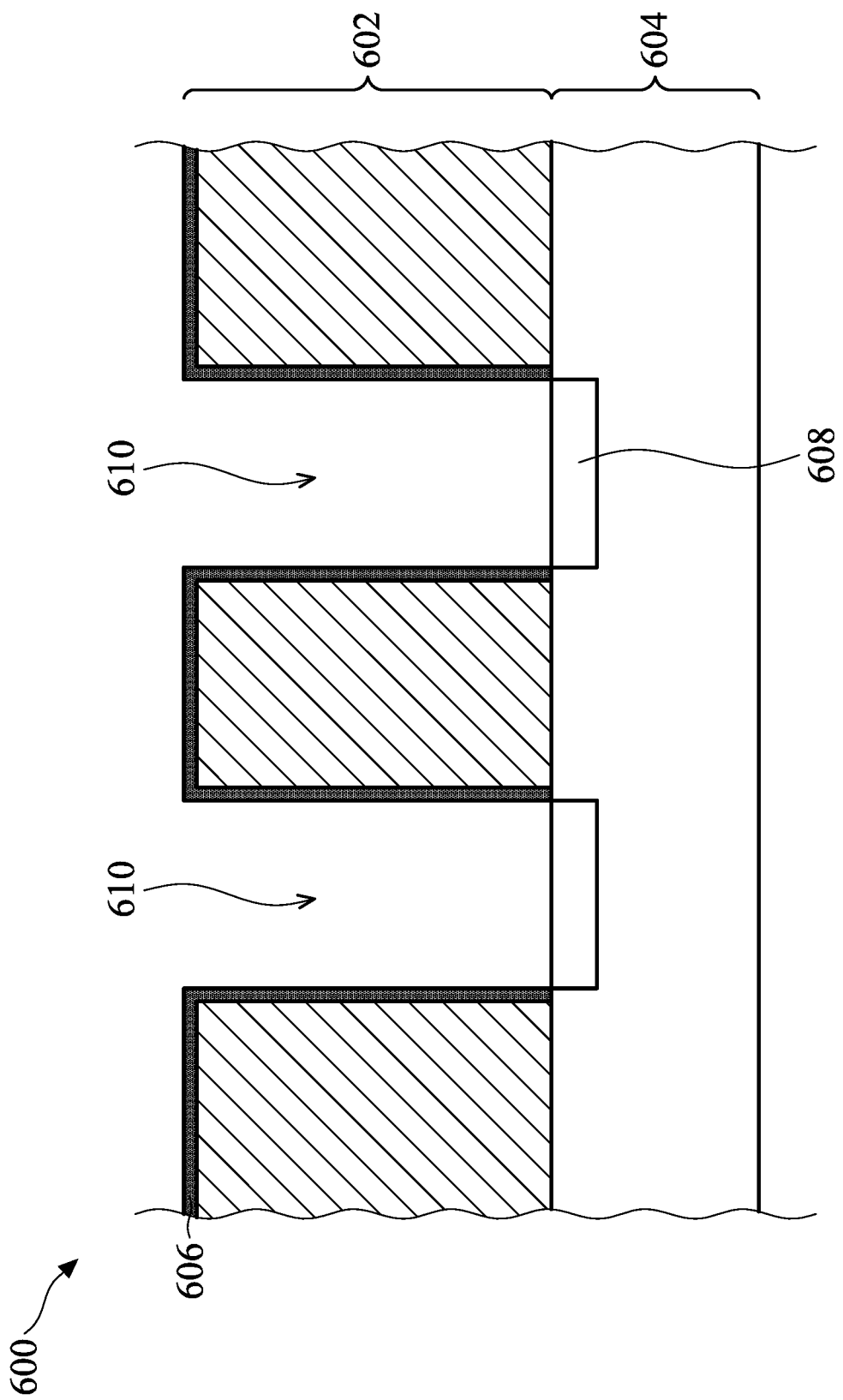
FIG. 6 is a schematic view illustrating an optical sensor according to a further embodiment of the present invention.

FIG. 6 is a schematic view of an optical sensor 600 according to another embodiment of the present invention. The optical sensor 600 includes a collimator layer 602 and an image sensing array 604 under the collimator layer 602. The image sensing array 604 further includes a plurality of pixels 608 disposed to correspond with openings 610 in the collimator layer 602. Furthermore, a light-shielding layer 606 is disposed on sidewalls of the openings 610 and an upper surface (second surface) of the collimator layer 602.

The difference between the light sensor 600 and the light sensor 400 in FIG. 4 is that the light-shielding layer 606 is further disposed on the upper surface of the collimator layer 602. By forming an additional light-shielding layer 606 on the upper surface of the collimator layer 602, unwanted incident light may be absorbed further to only allow incident light that is perpendicular to the pixels 608 to reach the pixels 608, thereby preventing image distortion during image sensing.

Figure 7:
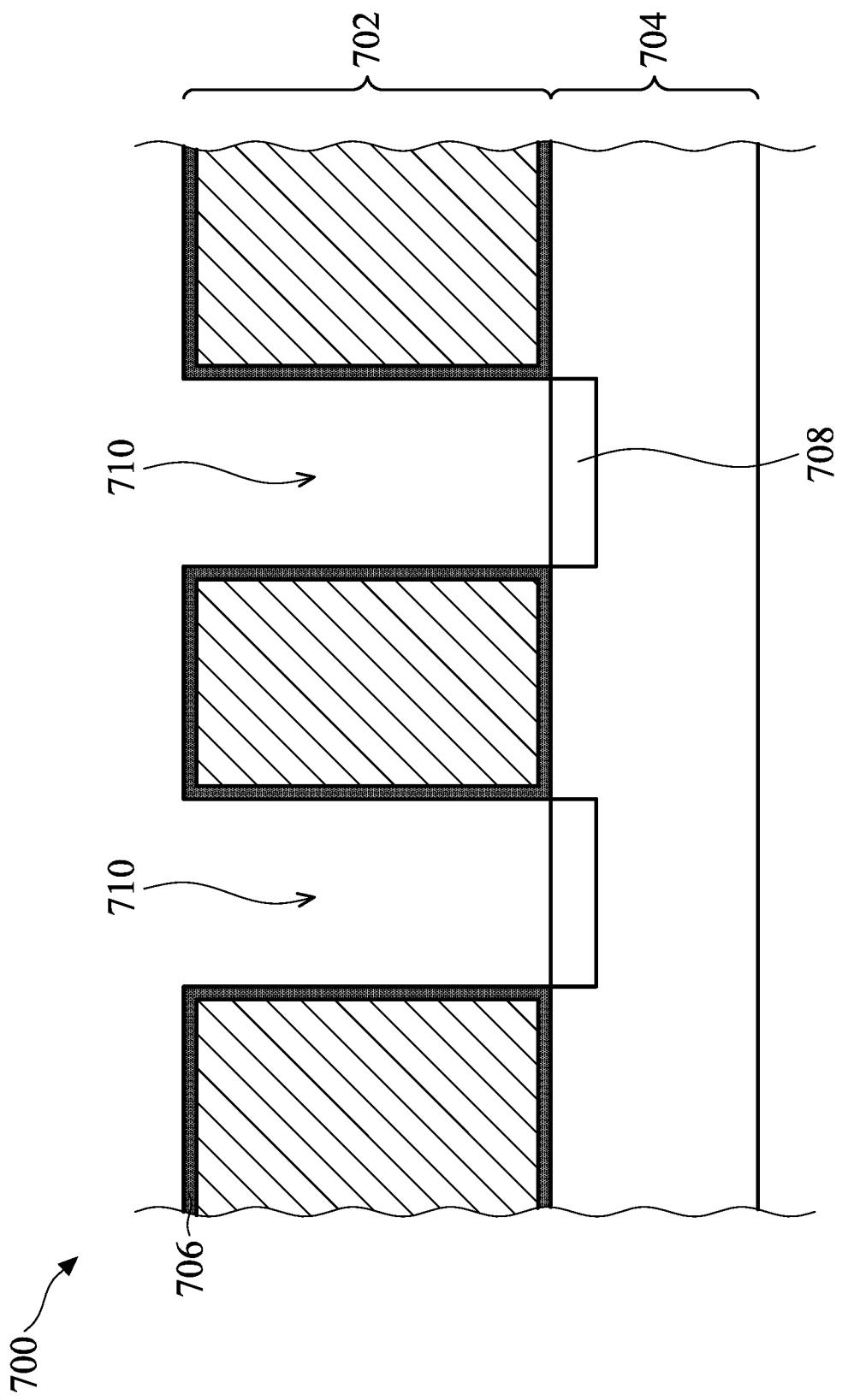
FIG. 7 is a schematic view illustrating an optical sensor according to a further embodiment of the present invention.

FIG. 7 is a schematic view of an optical sensor 700 according to a further embodiment of the present invention. The optical sensor 700 includes a collimator layer 702 and an image sensing array 704 under the collimator layer 702. The image sensing array 704 further includes a plurality of pixels 708 disposed to correspond with openings 710 in the collimator layer 702. Furthermore, a light-shielding layer 706 is disposed on sidewalls of the openings 710, between the collimator layer 702 and the light sensing array 704, and on the upper surface of the collimator layer 702.

The difference between the optical sensor 700 and the optical sensor 400 in FIG. 4 is that the light-shielding layer 706 surrounds the collimator layer 702, as shown in the cross-sectional view in FIG. 7. Using this configuration, unwanted incident light may be absorbed further to allow only incident light that is perpendicular to the pixels 708 to reach the pixels 708, thereby preventing image distortion during image sensing.

Figure 8:
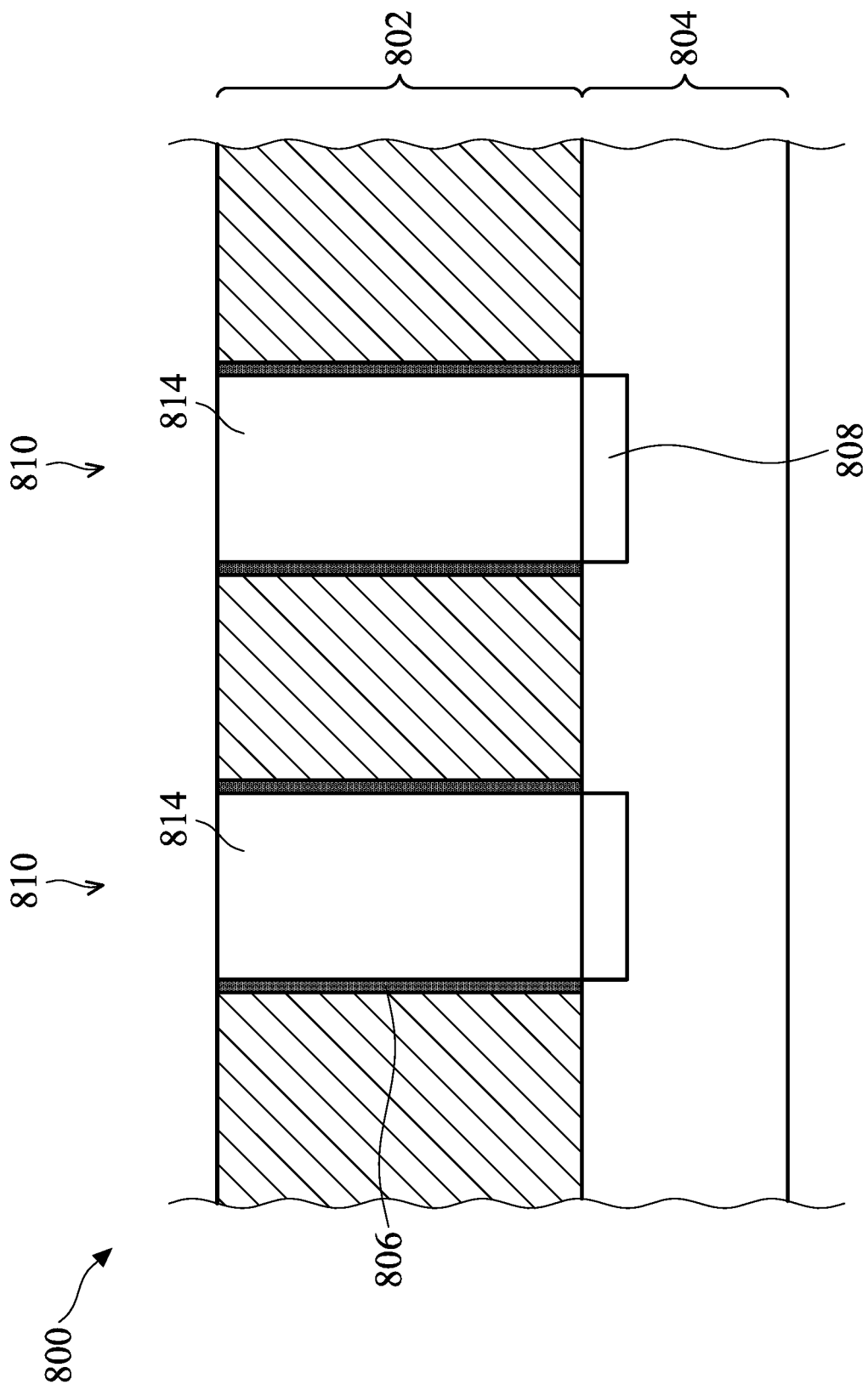
FIG. 8 is a schematic view illustrating an optical sensor according to a further embodiment of the present invention.

FIG. 8 is a schematic view of an optical sensor 800 according to a further embodiment of the present invention. The optical sensor 800 includes a collimator layer 802 and an image sensing array 804 under the collimator layer 802. The image sensing array 804 further includes a plurality of pixels 808 disposed to correspond with openings 810 in the collimator layer 802. Furthermore, a light-shielding layer 806 is disposed on sidewalls of the openings 810, and the openings 810 are filled with a transparent material 814. The transparent material 814 may include glass or transparent resin, such as polyethylene terephthalate (PET), polyethylene naphthalate (PEN), acrylic resin, epoxy resin, other materials or combinations thereof, and the light transmittance between 200-1100 nm of the transparent material 814 is greater than 70% to allow incident light to pass through the transparent material 814 and reach the pixels 808. By filling the transparent material 814 into the openings 810, foreign objects may be prevented from entering into the openings 810 during manufacturing of the optical sensor 800, which may cause the pixels 808 to be blocked by such foreign objects and lose their function of detecting incident light. As a result, the yield may be increased.

Figure 9A:
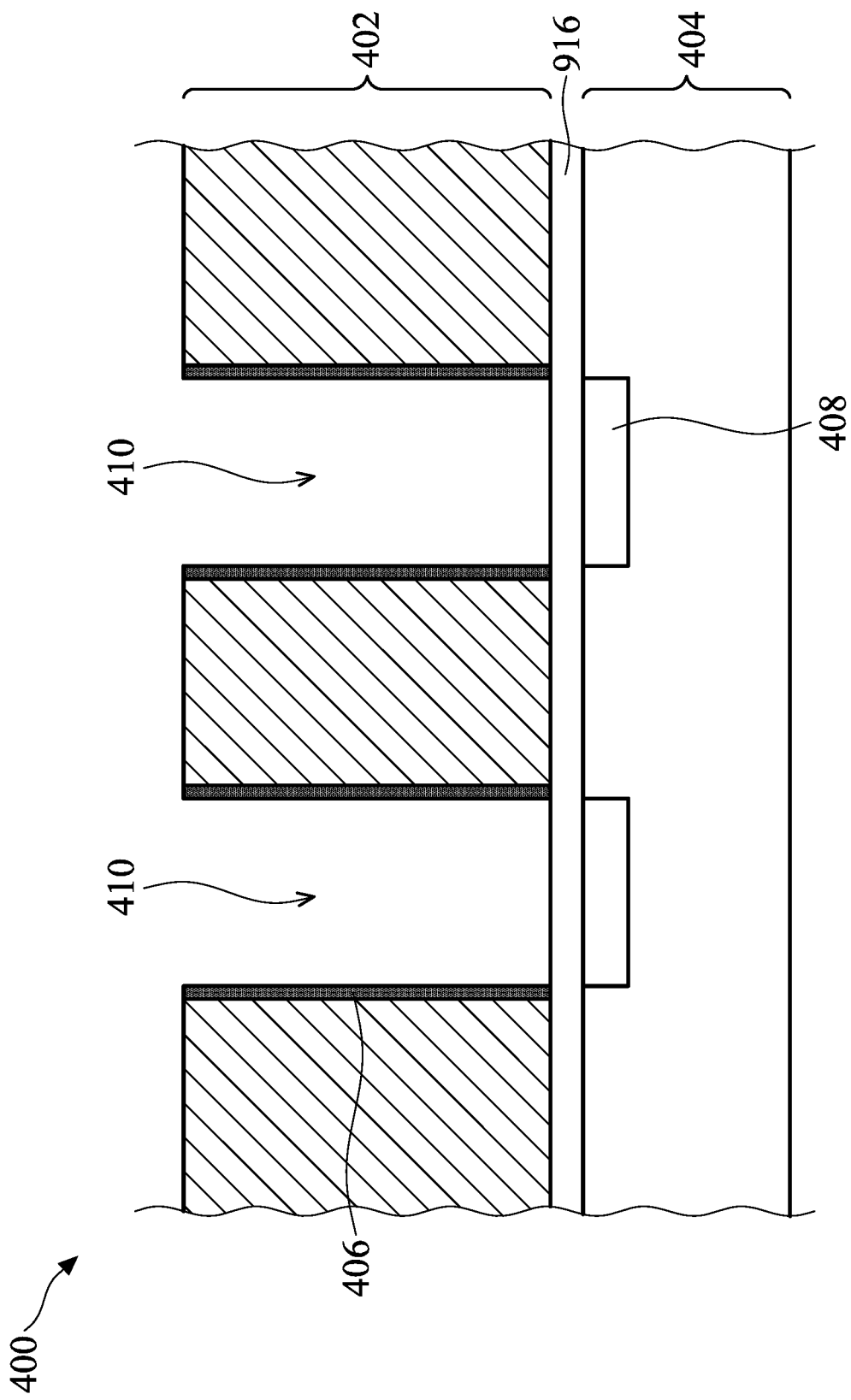
FIGS. 9A-9C are schematic views illustrating an optical sensor according to a further embodiment of the present invention.
Figure 9B:
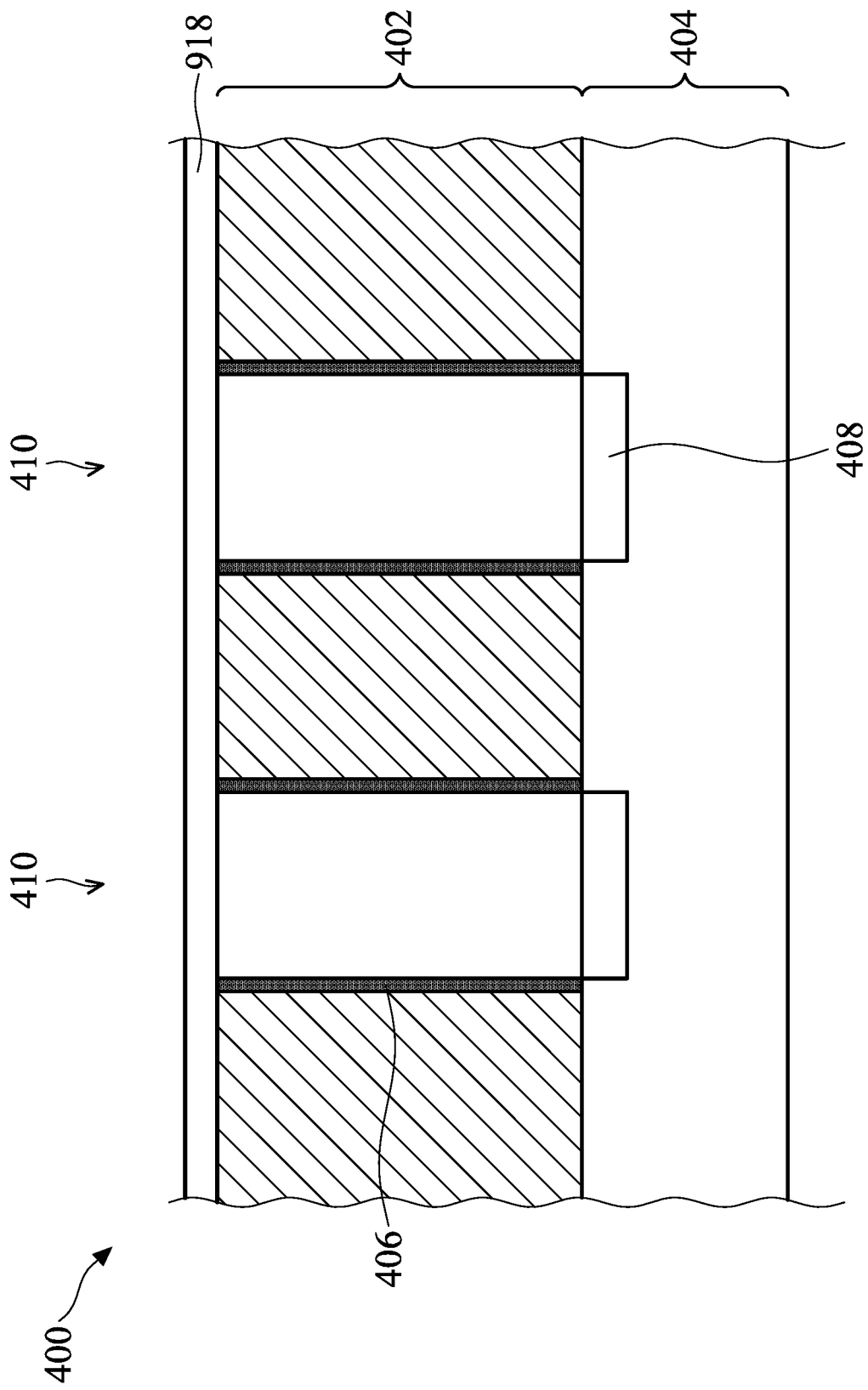
Figure 9C:
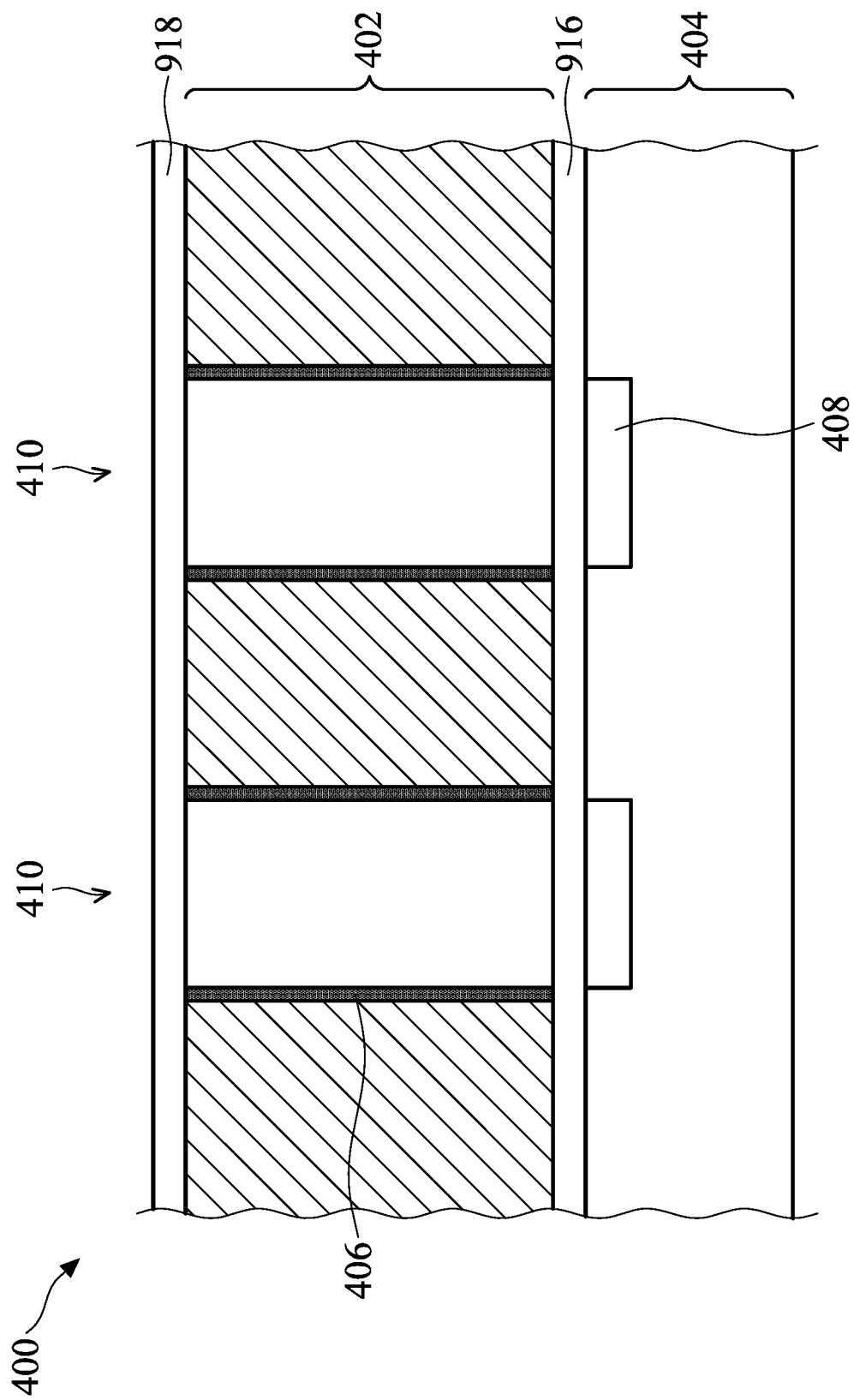

A light filtering layer may further be disposed on the optical sensor in the embodiments of the present invention. The light filtering layer is used for filtering a light source to allow only light with particular wavelengths to pass through, thereby preventing interference from light having other wavelengths, resulting in a clearer captured image. The material used in the light filtering layer may be a photoresist material, and light of various different wavelengths may be blocked by different photoresist materials. For example, if the incident light is visible light, the light filtering layer may be a translucent layer to allow enough light to pass through the light filtering layer and reach the pixels. As shown in FIG. 9A, the light filtering layer 916 may be disposed under a lower surface (first surface) of the collimator layer 402; or a light filtering layer 918 may be disposed on the upper surface (second surface) of the collimator layer 402, as shown in FIG. 9B; or the light filtering layers 916 and 918 may be disposed on the upper surface and the lower surface of the collimator layer 402 at the same time, depending on design requirements, as shown in FIG. 9C. Furthermore, depending on design requirements, in the embodiments illustrated in FIGS. 5-8, the light filtering layer may be disposed on the upper surface or the lower surface of the collimator layer using the same method to achieve an effect that is the same or similar.

In the embodiments shown in FIGS. 4-9, although the light-shielding layer is illustrated as one layer, the present invention is not limited thereto. For example, more than one light-shielding layer (e.g. 2-5 layers) made of the same or different materials may be included in the above embodiments, depending on design requirements. As a result, a better light-shielding effect may be achieved.

Figure 10A:
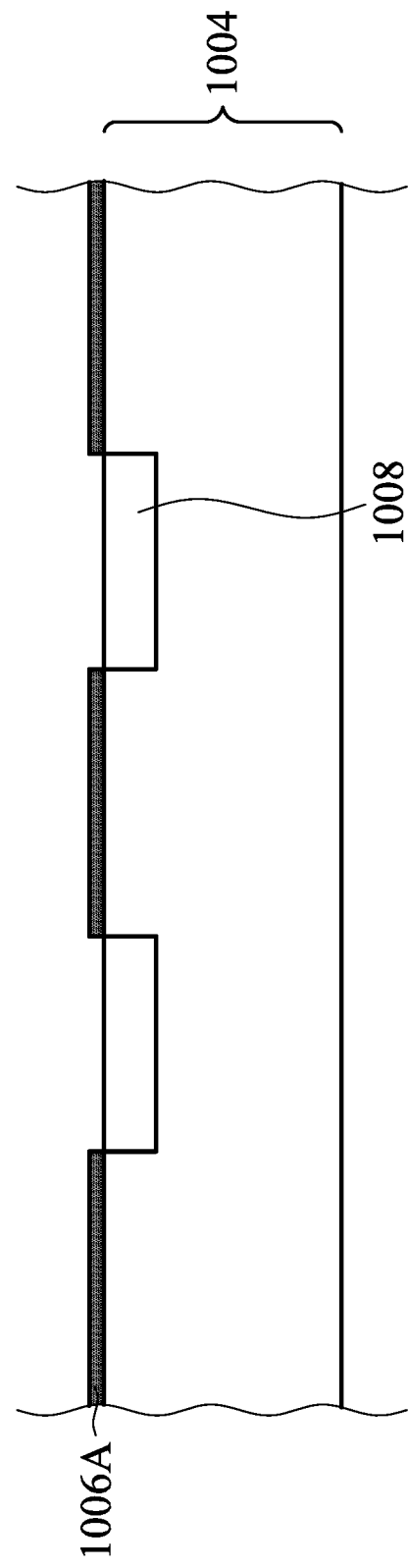
FIGS. 10A-10E are a series of cross-sectional views illustrating a method of manufacturing an optical sensor according to an embodiment of the present invention.

FIGS. 10A-10E are a series of cross-sectional views for illustrating a method of manufacturing an optical sensor 1000 according to an embodiment of the present invention. In FIG. 10A, an image sensing array 1004 having a plurality of pixels 1008 with spacing disposed thereon is provided. After that, a bottom light-shielding layer 1006A is disposed between the pixels 1008, but is not disposed on the pixels 1008.

The method of forming the bottom light-shielding layer 1006A includes forming a light shielding material on the image sensing array 1004 by processes such as chemical vapor deposition (CVD), physical vapor deposition (PVD) or spin coating, etc. After that, the light shielding material on the pixels is patterned by lithography and etching processes to ensure that the bottom light-shielding layer 1006A is only located between the pixels 1008 and not on the pixels 1008. The etching process may be, for example, reactive ion etch (RIE), neutral beam etch (NBE), a similar process, or a combination thereof, and the etching process may be anisotropic. The light shielding material may be, for example, the same material as that of the light-shielding layer 406.

Figure 10B:
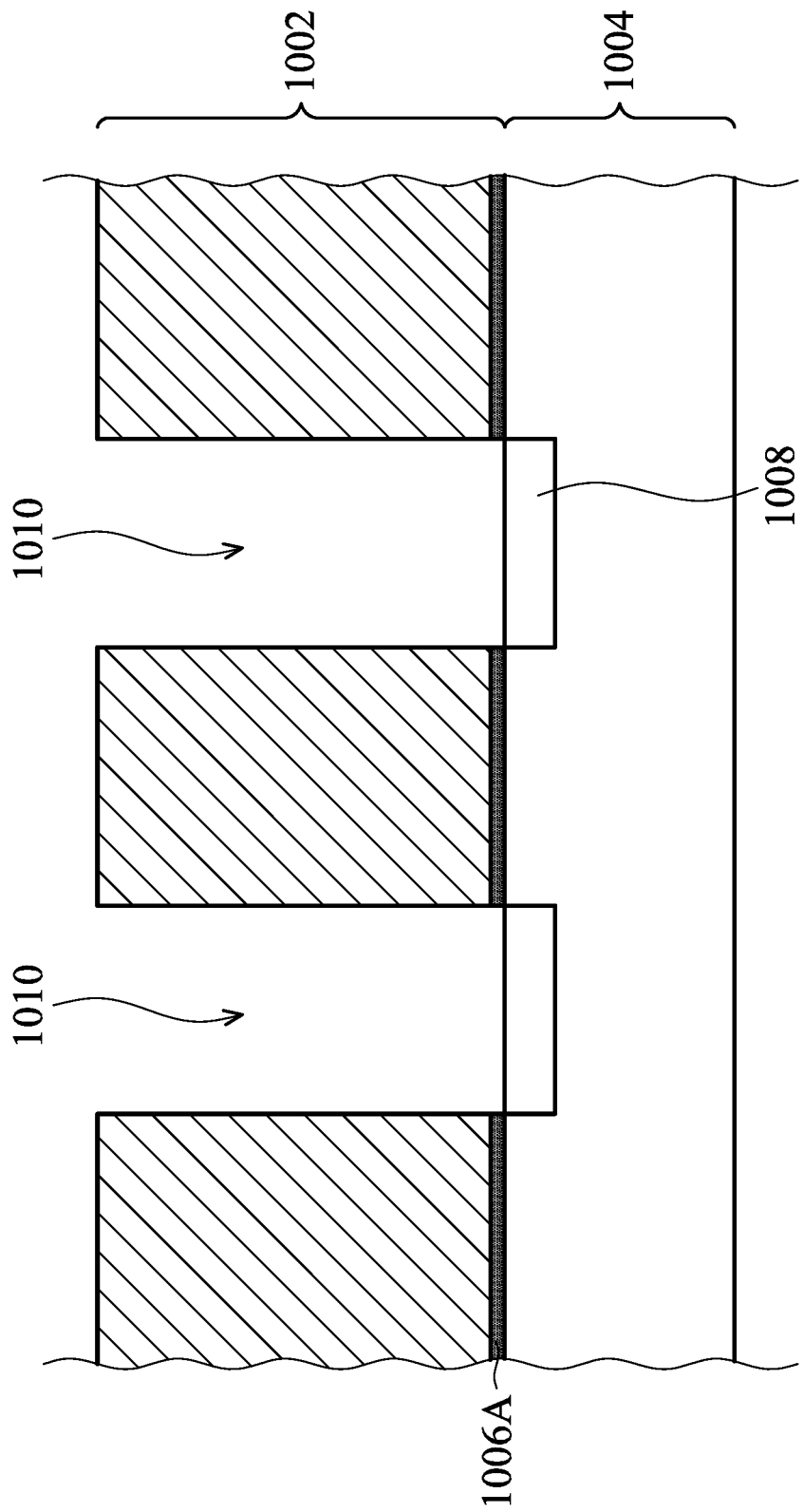

In FIG. 10B, a material used in the collimator layer (e.g. silicon or metal material (such as copper, nickel, metal alloy, etc.)) may be disposed on the image sensing array 1004, and openings 1010 corresponding to the pixels 1008 may be formed by lithography and etching processes, thereby forming a collimator layer 1002.

Figure 10C:
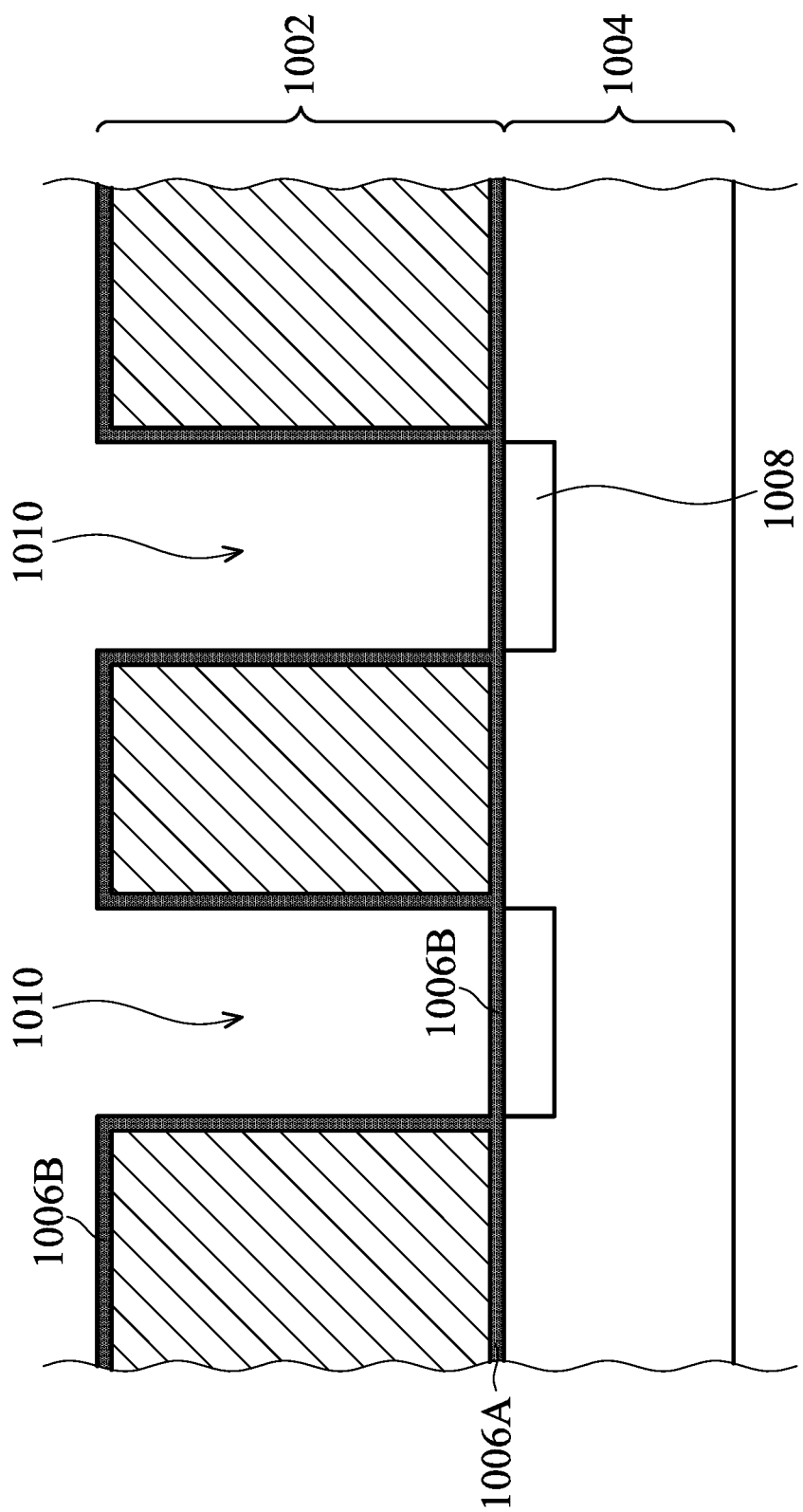

In FIG. 10C, a light shielding material 1006B is conformally disposed on the collimator layer 1002 and the image sensing array 1004, wherein the light shielding material 1006B covers the collimator layer 1002, the pixels 1008 and sidewalls of the openings 1010. The material and manufacturing process for the light shielding material 1006B may be similar or the same as that of the bottom light-shielding layer 1006A.

Figure 10D:
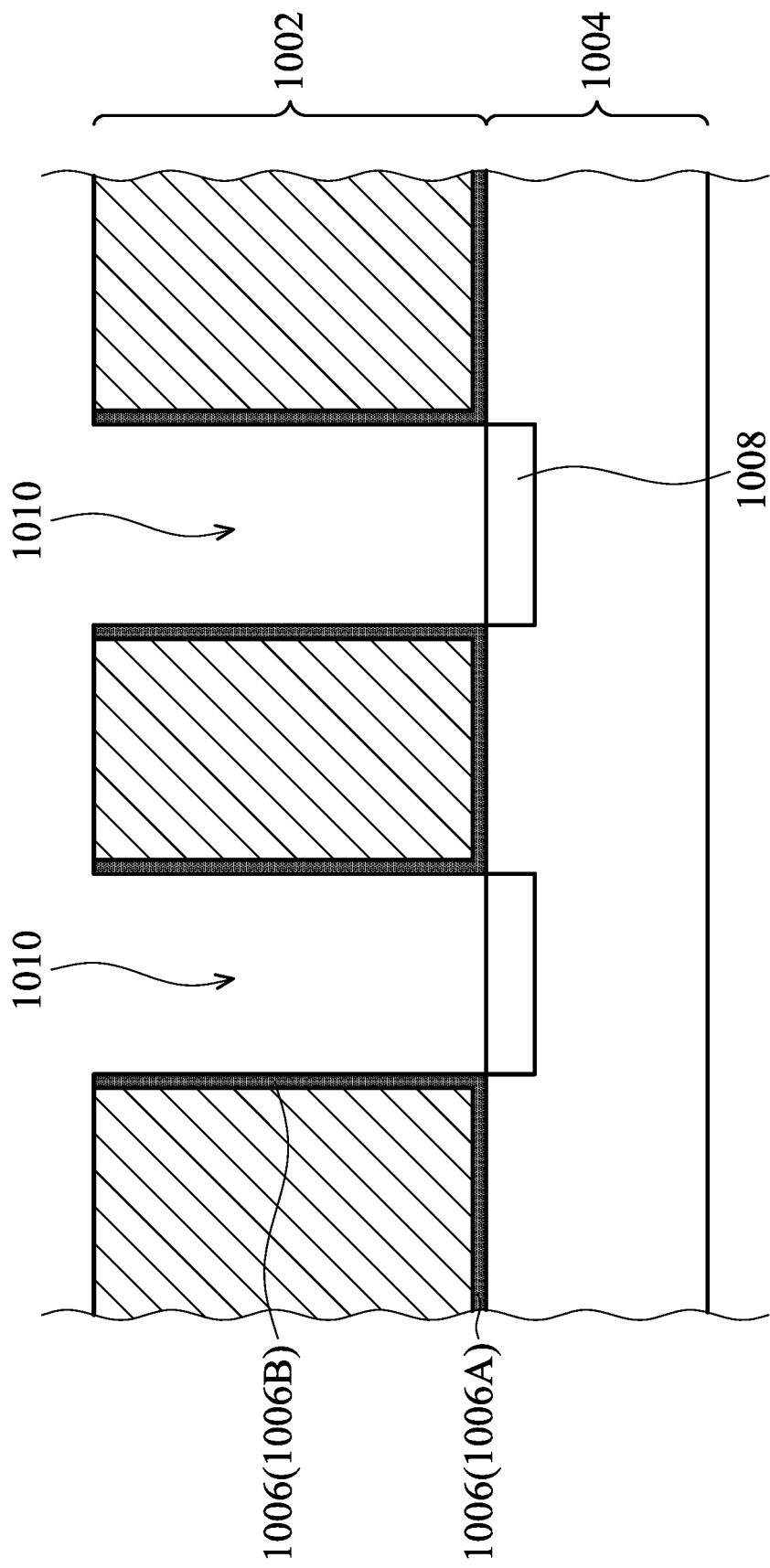

In FIG. 10D, the light shielding material 1006B on the upper surface of the collimator layer 1002 and the pixels 1008 is removed by an etching back process, and only the light shielding material 1006B on the sidewalls is left. The etching back process may be, for example, a gas cluster ion beam process or another suitable etching back process. After the etching back process, the bottom light-shielding layer 1006A and the light shielding material 1006B together form a light-shielding layer 1006.

Figure 10E:
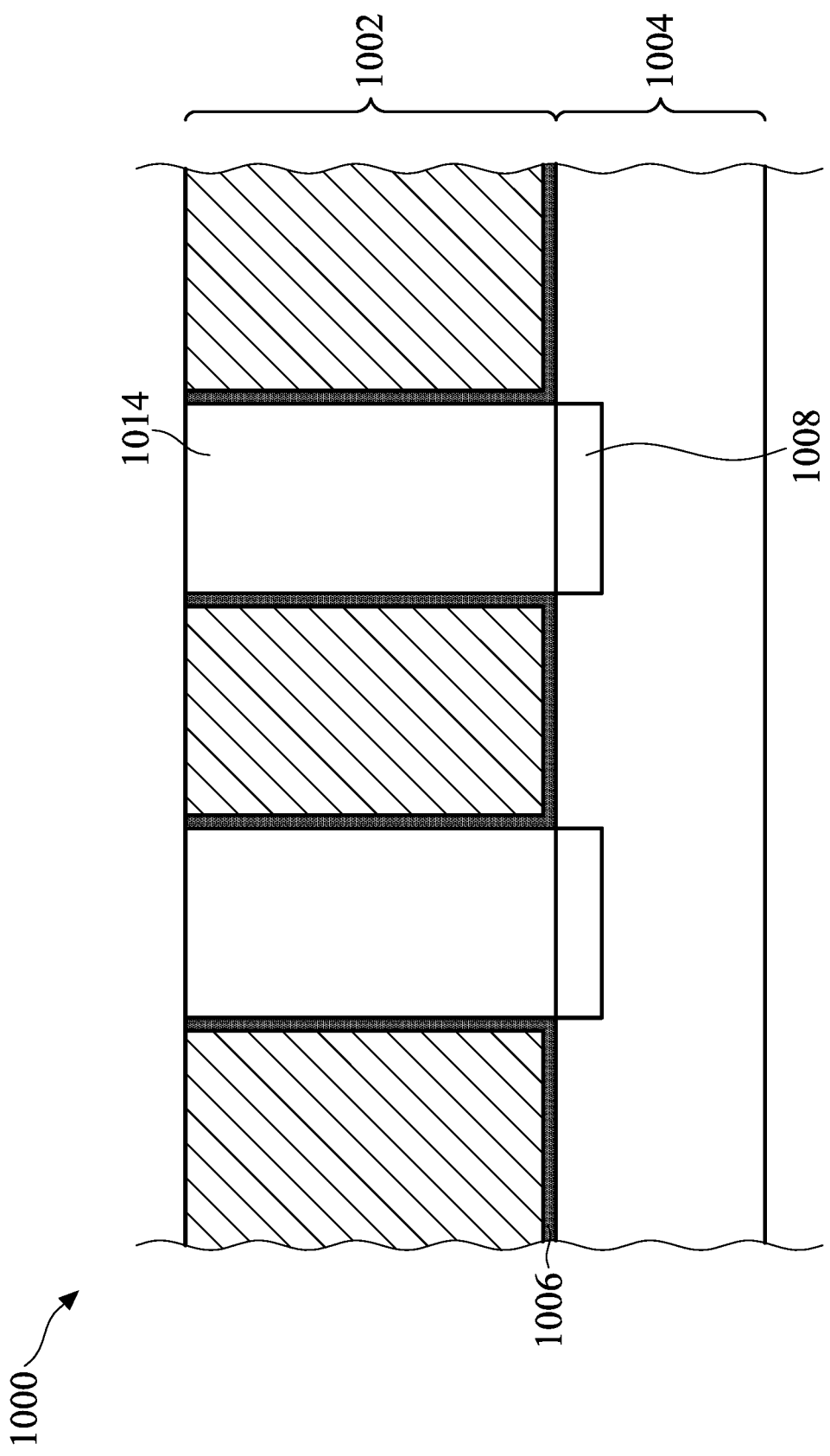

In FIG. 10E, the openings 1010 are filled with a transparent material 1014 using a suitable deposition process, thereby forming the optical sensor 1000. Foreign objects are prevented from entering through the openings 1010 during subsequent processes by filling the transparent material 1014 into the openings 1010, thereby preventing the pixels 1008 from being blocked by foreign objects, which can cause the pixels to be ineffective in detecting light. The material used in the transparent material 1014 may be the same as that of the transparent material 814, and is not repeated herein.

It should be noted that the steps are only exemplary and are not for limiting this invention. The steps may be modified, omitted or increased. For example, the step in FIG. 10E may be omitted, and the bottom light-shielding layer 1006A in FIG. 10A may not be disposed, thereby achieving the same structure as the optical sensor 400 in FIG. 4.

Figure 11A:
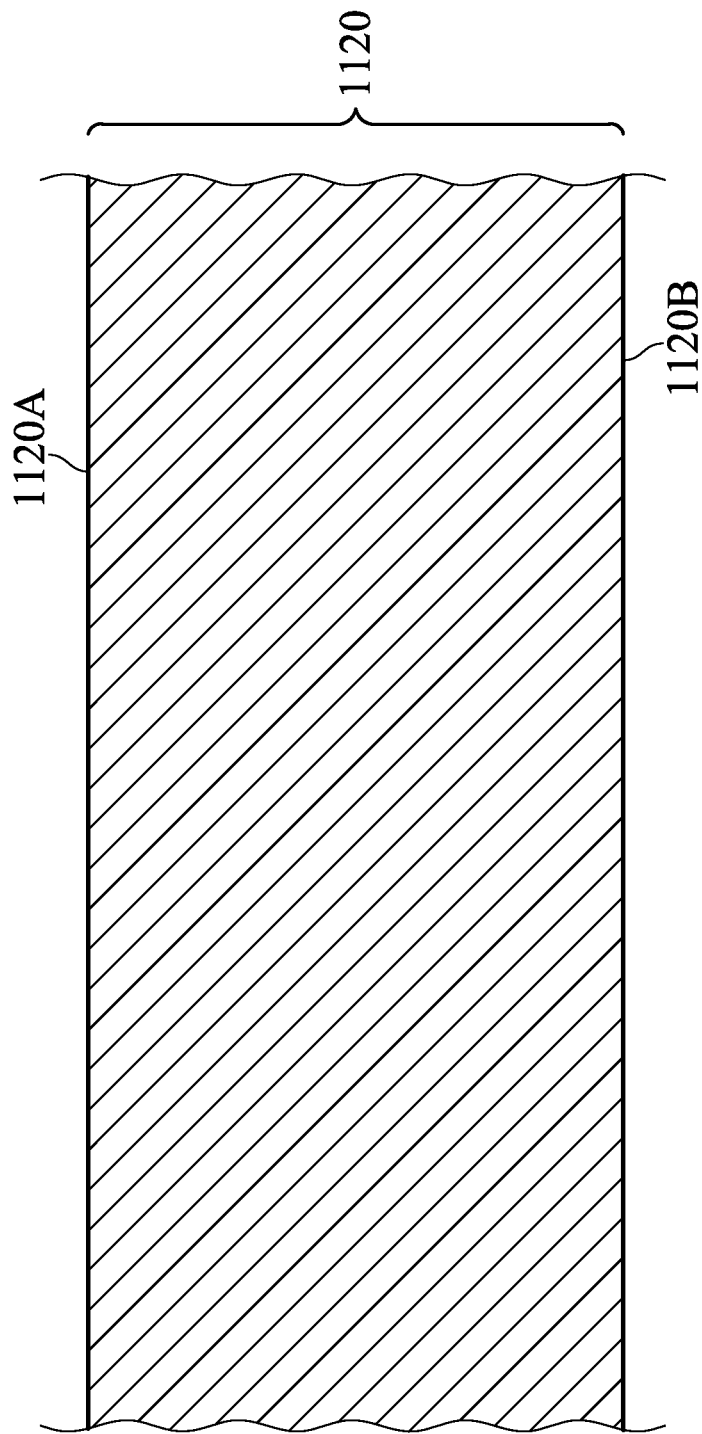
Figure 11B:
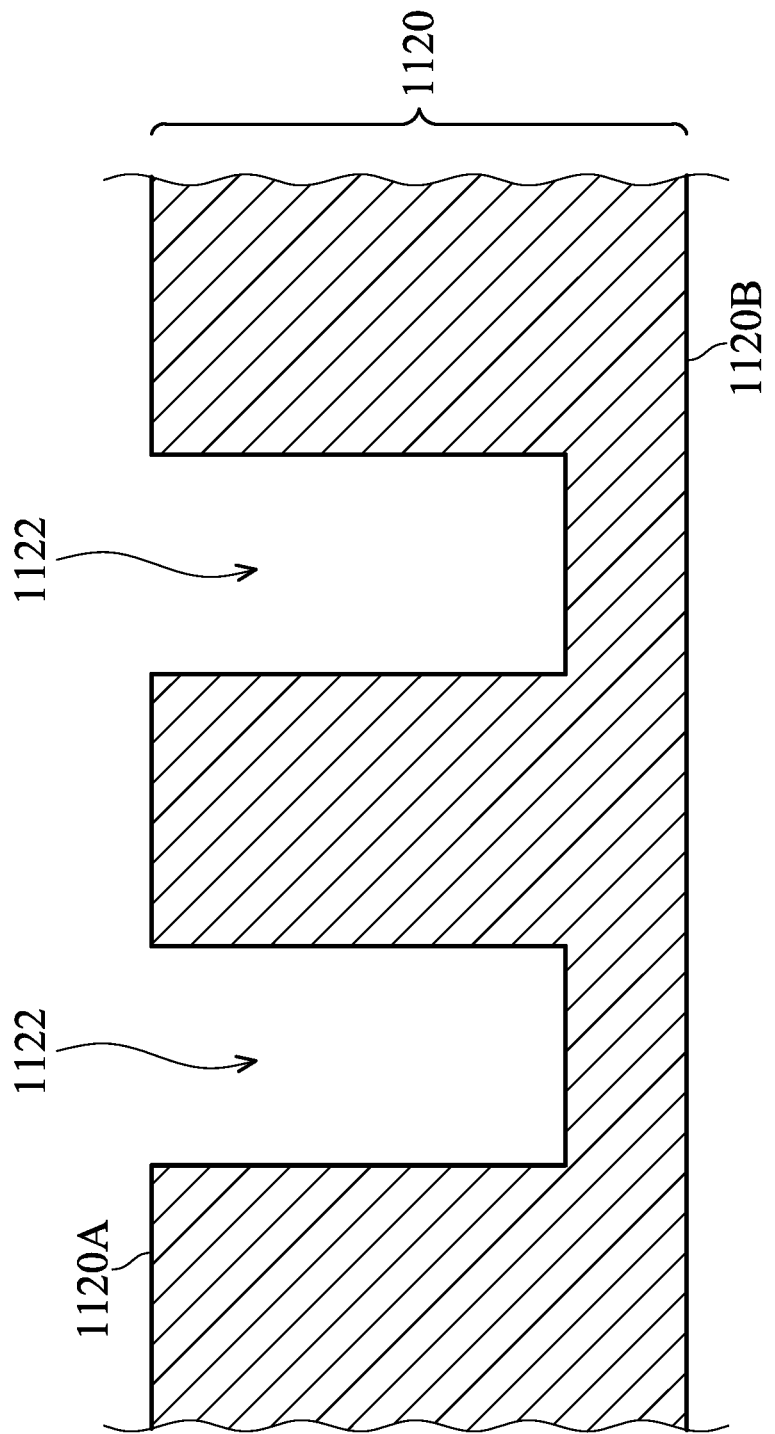

FIGS. 11A-11H are a series of cross-sectional views for illustrating a method of manufacturing an optical sensor 1100 according to another embodiment of the present invention. In FIG. 11A, a substrate 1120 is provided, which may act as a collimator layer in subsequent processes. The material used in the substrate 1120 may include, for example, silicon, metal and other nonmetal materials, and the substrate 1120 may include a front surface 1120A and a back surface 1120B. In FIG. 11B, a plurality of recesses 1122 may be formed on the front surface 1120A of the substrate 1120 by lithography and etching processes. In FIG. 11C, a first light-shielding layer 1106A may be formed on the front surface 1120A and in the recesses 1122 of the substrate 1120 by deposition. The material and deposition method of the first light-shielding layer 1106A may be the same as that of the light-shielding layer 406.

Figure 11D:
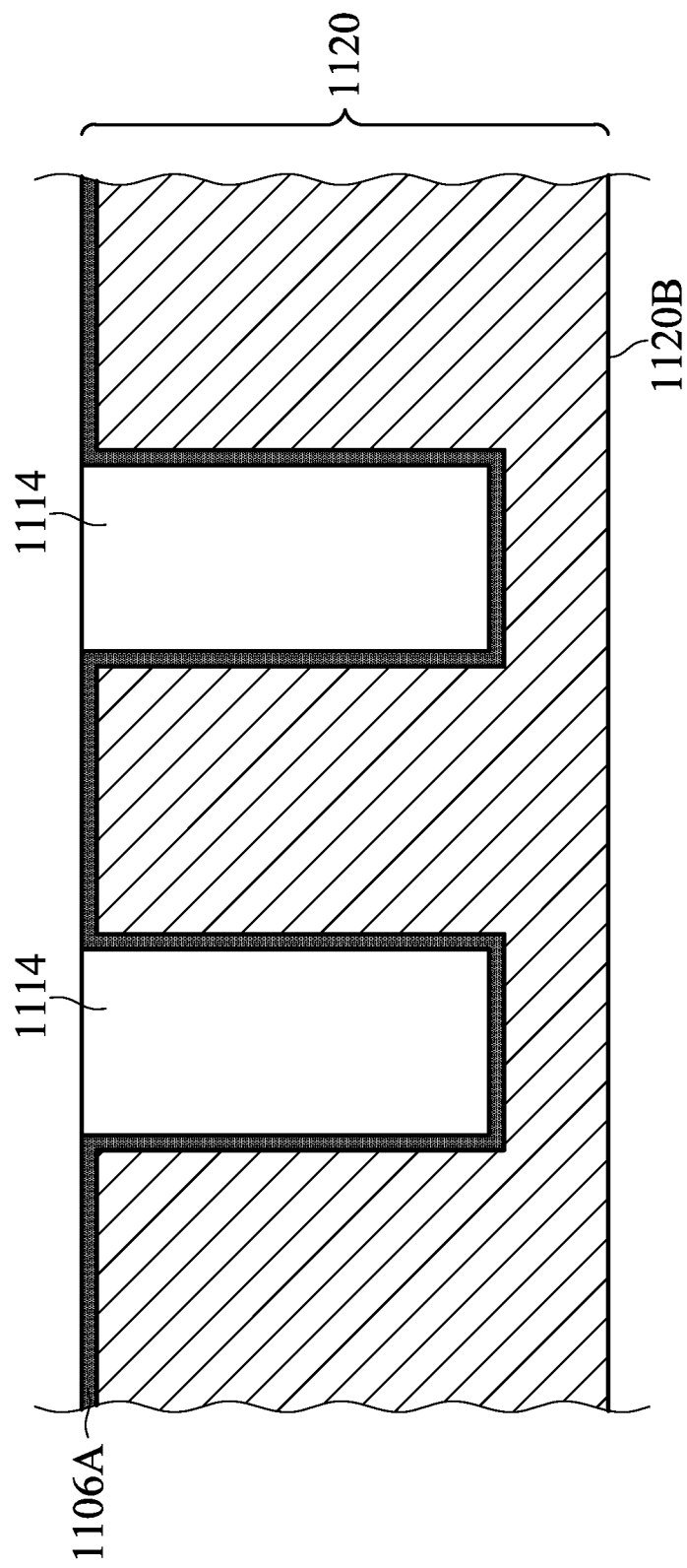
Figure 11E:
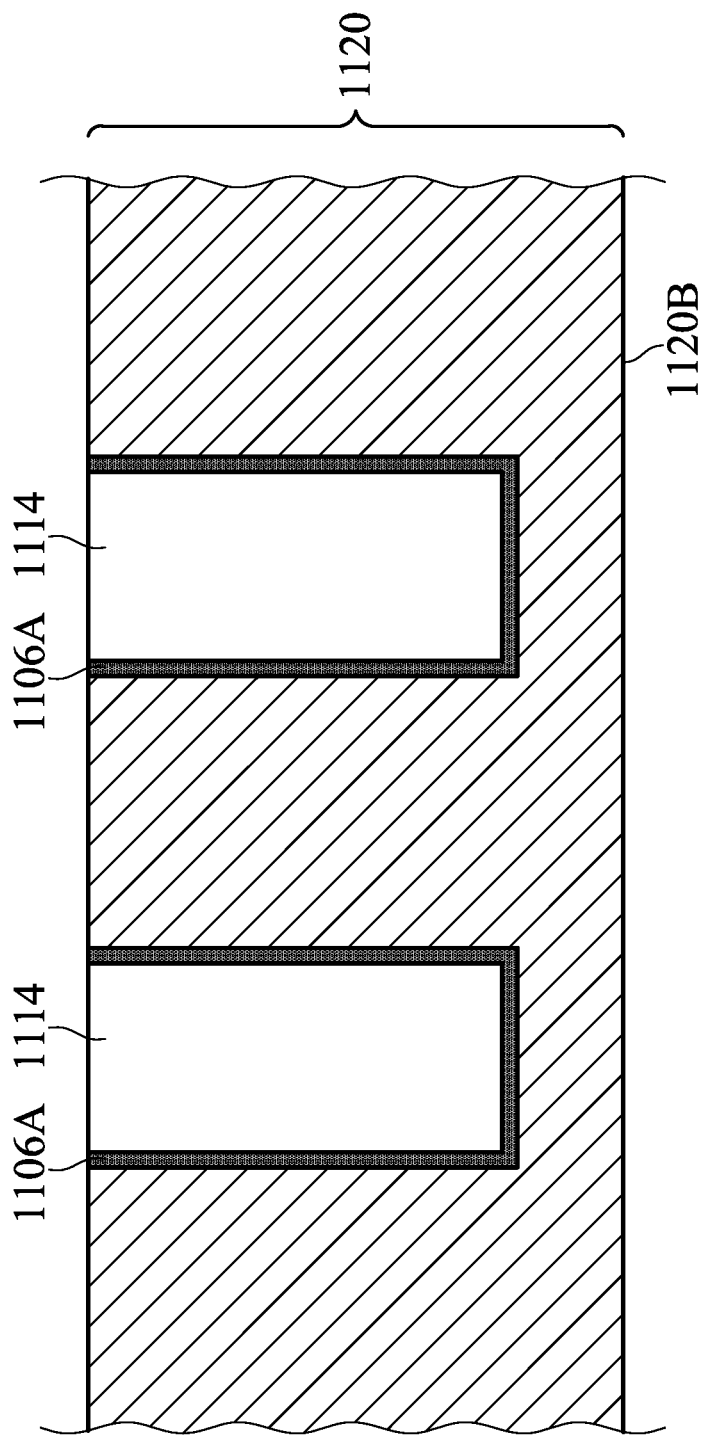

In FIG. 11D, a transparent material 1114 is filled in the recesses 1122. In FIG. 11E, the substrate 1120 is planarized to remove the first light-shielding layer 1106A on a surface of the substrate 1120, and to allow the substrate 1120 and the transparent material 1114 to have a flat top surface together. The planarization operation may include chemical mechanical polishing and/or etching back processes. The material used in the transparent material 1114 may be the same as that of the transparent material 814, and is not repeated herein.

Figure 11F:
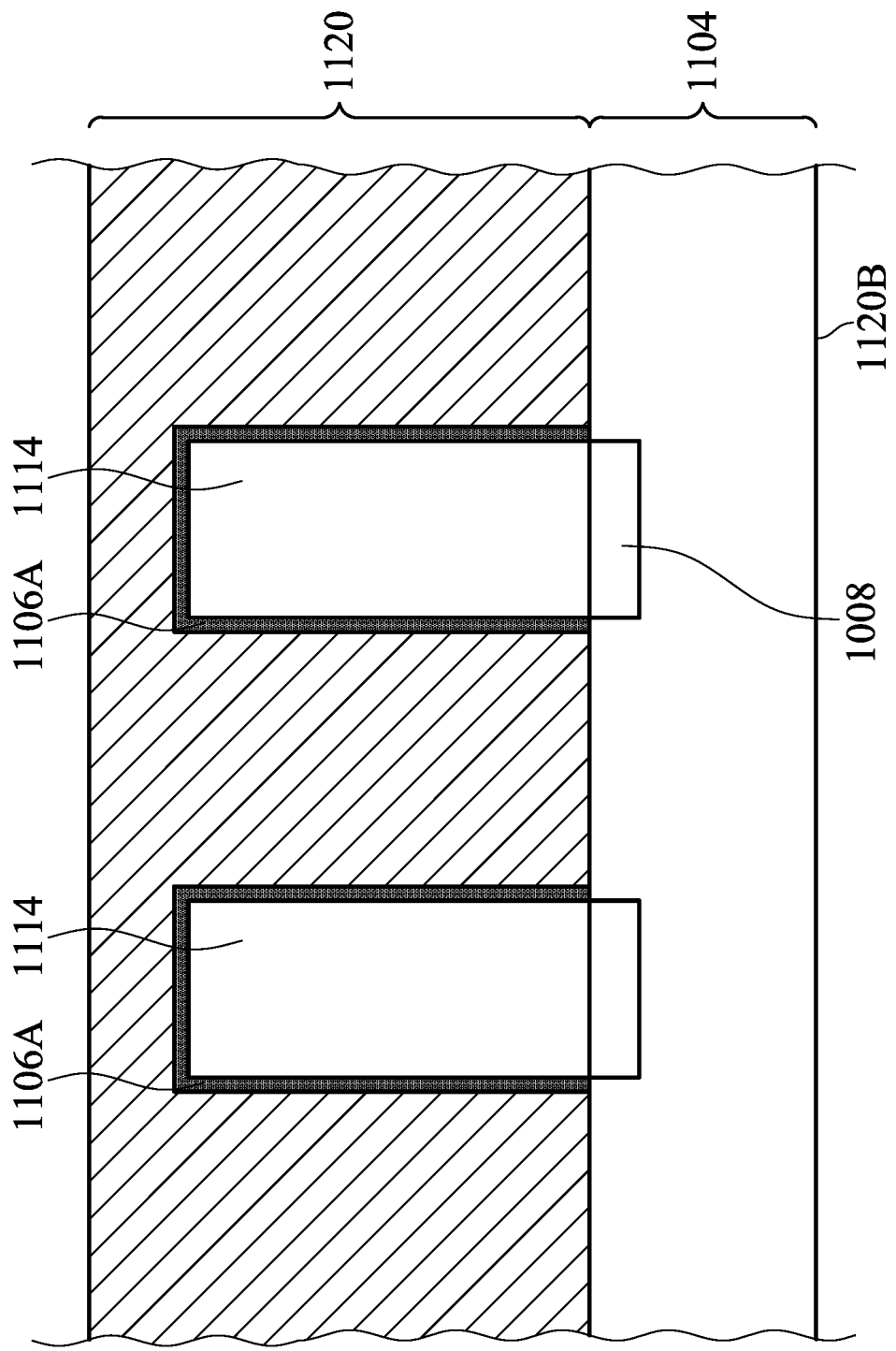
Figure 11G:
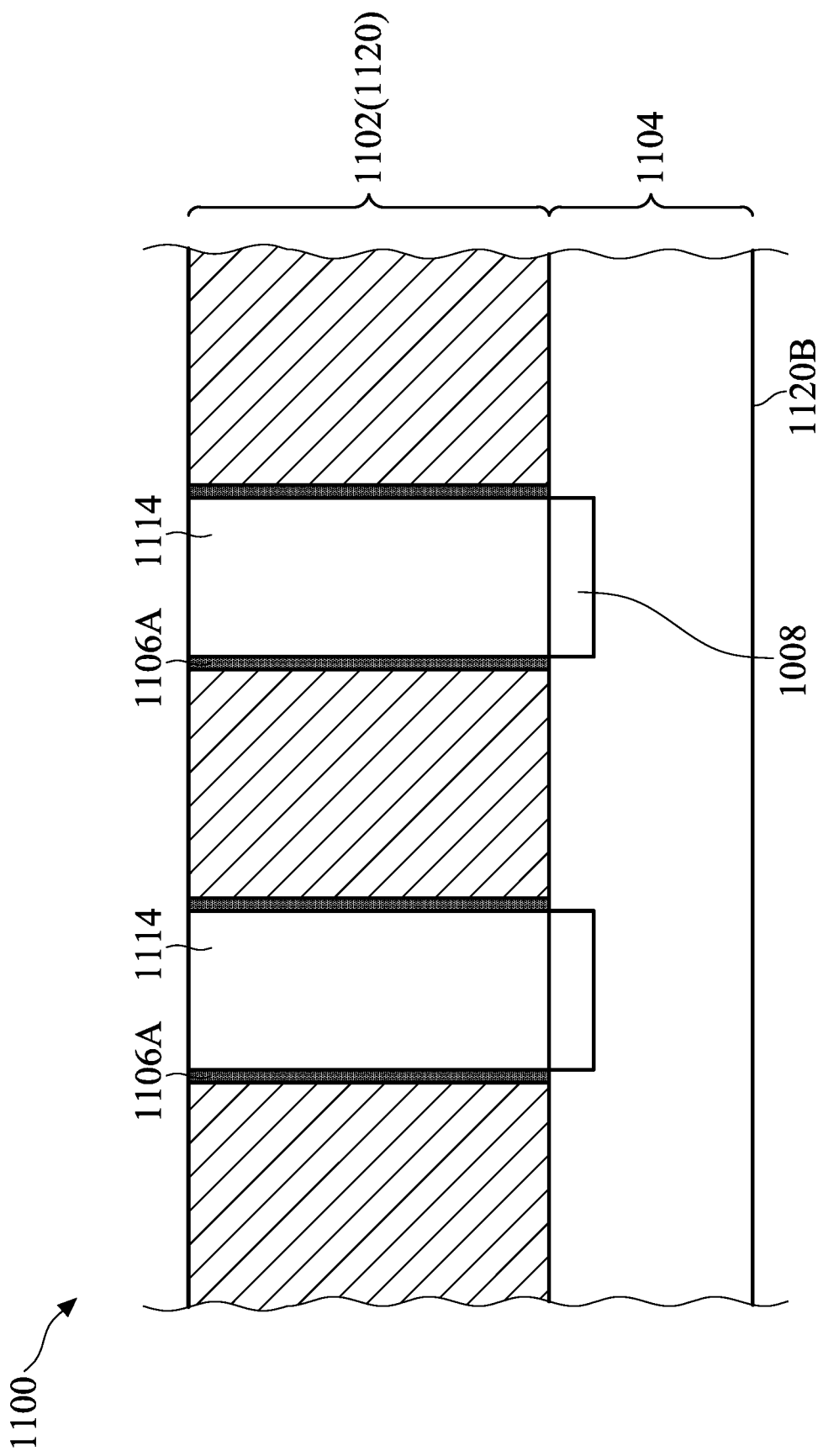

In FIG. 11F, the substrate 1120 is inverted and bonded to an image sensing array 1004. A plurality of pixels 1108 are on the image sensing array 1104 and are corresponding to the position of the transparent material 1114. In FIG. 11G, the substrate 1120 is planarized from its back side 1120B until the transparent material 1114 is exposed. The method of planarization of the substrate 1120 may be the same as that illustrated in FIG. 11E. The substrate 1120 after planarization may serve as a collimator layer 1102. As a result, an optical sensor 1100 is formed.

Figure 11H:
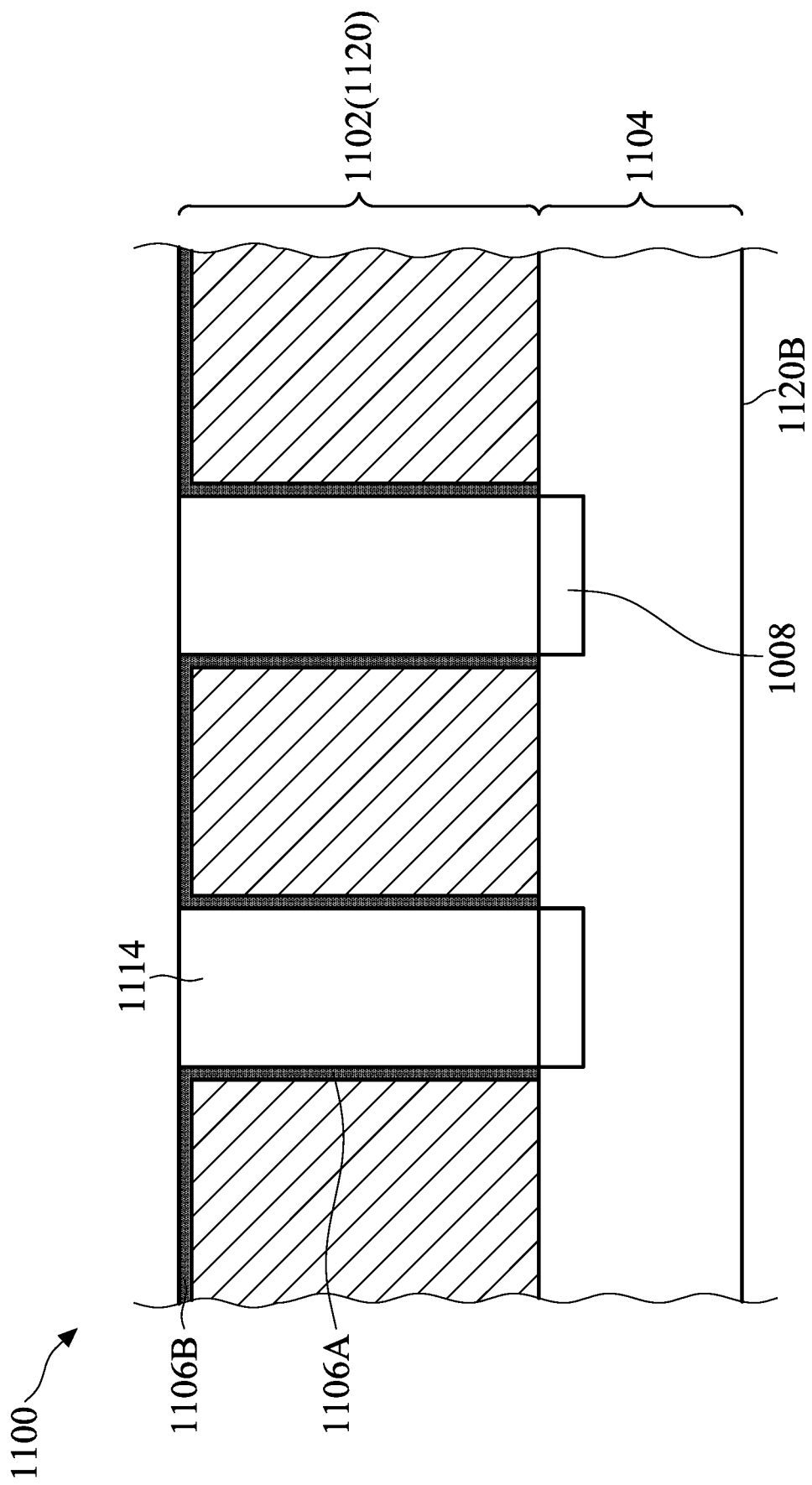

It should be noted that the steps are only exemplary and are not for limiting this invention. The steps may be modified, omitted or increased. For example, as shown in FIG. 11H, a second light-shielding layer 1106B may be disposed on the back surface 1120B of the substrate 1120 to further block light from the outside, thereby preventing light which is not perpendicular to the pixels 1108 from reaching the pixels 1108.

In summary, an optical sensor including a collimator is provided in the present invention, wherein a light-shielding layer which can absorb light having a particular wavelength may be included on the collimator. If incident light is not perpendicular to the collimator, it may be blocked by the collimator or be absorbed by the light-shielding layer. As a result, the light incident to the optical sensor may be ensured to be perpendicular, thereby preventing the problem of pixels receiving non-perpendicular incident light, which may cause the detected image to be blurry. Furthermore, the light-shielding layer is disposed in a simple way in the present invention, which may reduce time required to perform the processes, thereby reducing the cost. Moreover, a transparent material is disposed in the openings of the collimator to prevent dust from entering the openings during manufacturing.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An optical sensor, comprising:
   an image sensing array comprising a plurality of pixels;
   a collimator layer disposed on the image sensing array and comprising a plurality of openings corresponding to the pixels, wherein the collimator layer comprises a first surface facing the image sensing array and a second surface opposite to the first surface; and
   a light-shielding layer disposed on sidewalls of the openings, wherein one of the first surface and the second surface is exposed from the light-shielding layer.

2. The optical sensor as claimed in claim 1, wherein the light-shielding layer is further disposed on the first surface of the collimator layer.

3. The optical sensor as claimed in claim 1, wherein material used in the light-shielding layer comprises opaque resin or dark resin.

4. The optical sensor as claimed in claim 1, wherein the light-shielding layer comprises a multilayer structure.

5. The optical sensor as claimed in claim 1, further comprising a light filtering layer disposed on the first surface and/or the second surface of the collimator layer.

6. The optical sensor as claimed in claim 1, wherein diameters of the openings are 1-100 μm.

7. The optical sensor as claimed in claim 1, wherein thickness of the collimator layer is 1-500 μm.

8. The optical sensor as claimed in claim 1, further comprising a transparent material disposed on the openings.

9. The optical sensor as claimed in claim 8, wherein the transparent material comprises resin or glass.

10. A method for manufacturing an optical sensor, comprising:
    providing an optical sensing array, wherein the optical sensing array comprises a plurality of pixels;
    forming a collimator layer on the optical sensing array, wherein the collimator layer comprises a plurality of openings corresponding to the pixels, and the collimator layer has a first surface facing the optical sensing array and a second surface opposite to the first surface; and
    forming a light-shielding layer on sidewalls of the openings, wherein one of the first surface and the second surface is exposed from the light-shielding layer.

11. The method as claimed in claim 10, further comprising forming a bottom light-shielding layer between the pixels before forming the collimator layer.

12. The method as claimed in claim 10, further comprising filling a transparent material in the openings after forming the light-shielding layer.

13. The method as claimed in claim 10, wherein forming the light-shielding layer comprises:

conformally forming a light shielding material on the second surface of the collimator layer and on a bottom and sidewalls of the openings; and etching the light shielding material on the second surface of the collimator layer and on the bottom of the openings to remove the light-shielding layer.

14. A method for manufacturing an optical sensor, comprising:

providing a substrate;

forming a plurality of recesses on a first surface of the substrate;

forming a first light-shielding layer on sidewalls and a bottom of the recesses;

inverting and bonding the substrate to an image sensing array to dispose the recesses corresponding to a plurality of pixels of the image sensing array; and thinning the substrate from a back surface of the substrate until the first light-shielding layer on the bottom of the recesses is removed, a second surface of the substrate is formed after the thinning step, and the second surface is opposite from the first surface, wherein one of the first surface and the second surface is exposed from the first light-shielding layer.

15. The method as claimed in claim 14, wherein forming the first light-shielding layer further comprises forming the first light-shielding layer on the second surface of the substrate.

16. The method as claimed in claim 14, further comprising filling a transparent material in the recesses after forming the first light-shielding layer on the sidewalls and the bottom of the recesses and before inverting and bonding the substrate to the image sensing array, and thinning the substrate further comprises exposing the transparent material.

17. The method as claimed claim 14, further comprising forming a second light-shielding layer at the second surface of the substrate after thinning the substrate.

18. The method as claimed claim 15, further comprising forming a second light-shielding layer at the second surface of the substrate after thinning the substrate.

19. The optical sensor as claimed in claim 1, wherein the first surface is covered by the collimator layer.

20. The optical sensor as claimed in claim 1, wherein a material of the collimator layer comprises silicon, metal or metal alloy.

* * * * *